United States Patent
Li et al.

(10) Patent No.: US 11,935,211 B2
(45) Date of Patent: Mar. 19, 2024

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Guobin Li, Shanghai (CN); Renkuan Zhai, Shanghai (CN); Meiling Ji, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 236 days.

(21) Appl. No.: 17/445,611

(22) Filed: Aug. 23, 2021

(65) Prior Publication Data
US 2022/0092739 A1 Mar. 24, 2022

(30) Foreign Application Priority Data

Sep. 21, 2020 (CN) .......................... 202010995736.2
Sep. 21, 2020 (CN) .......................... 202010999787.2

(51) Int. Cl.
*G06T 3/40* (2006.01)
*G06T 7/00* (2017.01)

(52) U.S. Cl.
CPC .............. *G06T 3/4053* (2013.01); *G06T 7/97* (2017.01); *G06T 2207/20016* (2013.01)

(58) Field of Classification Search
CPC ................ G06T 3/4053; G06T 7/97; G06T 2207/20016; G06T 2207/10088; G06T 2207/20048; G06T 3/4046; G06T 5/003; G06T 5/50

USPC ........................................................ 382/284
See application file for complete search history.

(56) References Cited

U.S. PATENT DOCUMENTS

| | | | |
|---|---|---|---|
| 2009/0285463 A1* | 11/2009 | Otazo | G06T 3/4053 382/131 |
| 2015/0221067 A1* | 8/2015 | Mahnken | G06T 5/001 382/131 |
| 2017/0307714 A1* | 10/2017 | Okell | G01R 33/56366 |
| 2019/0128991 A1* | 5/2019 | Shirai | A61B 5/055 |
| 2019/0147589 A1* | 5/2019 | Zhou | G06F 18/241 382/131 |
| 2019/0244399 A1* | 8/2019 | Li | G01R 33/56545 |
| 2020/0134796 A1* | 4/2020 | Gilra | G06T 5/50 |
| 2021/0201477 A1* | 7/2021 | Hu | G06T 7/0012 |

FOREIGN PATENT DOCUMENTS

CN 109618154 A * 4/2019

* cited by examiner

*Primary Examiner* — Matthew C Bella
*Assistant Examiner* — Pardis Sohraby
(74) *Attorney, Agent, or Firm* — METIS IP LLC

(57) ABSTRACT

Systems and methods for image processing are provided in the present disclosure. The systems and methods may obtain an image; determine a current resolution level of the image; determine, based on the current resolution level of the image, from a group of resolution level ranges, a reference resolution level range corresponding to the image; determine a target processing model corresponding to the reference resolution level range; and/or determine a processed image with a target resolution level by processing the image using the target processing model, the target resolution level of the processed image being higher than the current resolution level of the image.

20 Claims, 12 Drawing Sheets

800

| 810 | Obtaining a plurality of sample images with relatively low resolution levels and a plurality of sample images with relatively high resolution levels |

| 820 | Grouping the plurality of sample images with relatively low resolution levels and grouping the plurality of sample images with relatively high resolution levels |

| 830 | Obtaining a plurality of processing models by training each processing model using a corresponding group of sample images with relatively low resolution levels and a corresponding group of sample images with relatively high resolution levels |

| 840 | Selecting, from the plurality of processing models, the target processing model corresponding to the reference resolution level range |

| 910 | Acquiring first data associated with the plurality of sample images with relatively low resolution levels using a magnetic resonance imaging device |

| 920 | Generating the plurality of sample images with relatively low resolution levels based on the first data |

| 930 | Acquiring second data associated with the plurality of sample images with relatively high resolution levels using the magnetic resonance imaging device |

| 940 | Generating the plurality of sample images with relatively high resolution levels based on the second data |

FIG. 9

SYSTEMS AND METHODS FOR IMAGE PROCESSING

CROSS-REFERENCE TO RELATED APPLICATIONS

This application claims priority of Chinese Patent Application No. 202010995736.2 filed on Sep. 21, 2020, and Chinese Patent Application No. 202010999787.2 filed on Sep. 21, 2020, the contents of each of which are hereby incorporated by reference.

TECHNICAL FIELD

The present disclosure generally relates to image processing, and more particularly, systems and methods for generating an image with a super resolution level.

BACKGROUND

Medical imaging has been widely employed in disease diagnosis and/or treatment. Clarity of medical images may affect diagnosis results. However, due to limitations of medical imaging equipment and/or medical imaging technology, medical images with a relatively high resolution are often not directly available. Generally, the resolution level of a medical image can be improved by increasing the amount of image data generated in imaging and/or used for image reconstruction. However, increasing the amount of image data generated in imaging can increase the acquisition time of the image data and reduce the imaging efficiency. Therefore, it is desirable to develop systems and methods for generating an image with a relatively high resolution level efficiently and accurately.

SUMMARY

According to an aspect of the present disclosure, a method for image processing is provided. The method may be implemented on a computing device including a storage device and at least one processor. The method may include: obtaining an image; determining a current resolution level of the image; determining, based on the current resolution level of the image, from a group of resolution level ranges, a reference resolution level range corresponding to the image; determining a target processing model corresponding to the reference resolution level range; and/or determining a processed image with a target resolution level by processing the image using the target processing model, the target resolution level of the processed image being higher than the current resolution level of the image.

According to another aspect of the present disclosure, a method for image processing is provided. The method may be implemented on a computing device including a storage device and at least one processor. The method may include: obtaining initial k-space data generated by a magnetic resonance imaging device; generating first processed k-space data by padding k space of the initial k-space data with predetermined data; generating second processed k-space data based on the initial k-space data, an image associated with the second processed k-space data having a higher resolution than an initial image associated with the initial k-space data; determining, based on the initial image, a first weight matrix corresponding to the first processed k-space data and a second weight matrix corresponding to the second processed k-space data; generating target k-space data based on the first processed k-space data, the second processed k-space data, the first weight matrix, and the second weight matrix; and/or reconstructing a target image based on the target k-space data.

According to another aspect of the present disclosure, a system for image processing is provided. The system may include a storage device storing a set of instructions; and at least one processor in communication with the storage device. When executing the set of instructions, the at least one processor may be configured to direct the system to perform operations including: obtaining an image; determining a current resolution level of the image; determining, based on the current resolution level of the image, from a group of resolution level ranges, a reference resolution level range corresponding to the image; determining a target processing model corresponding to the reference resolution level range; and/or determining a processed image with a target resolution level by processing the image using the target processing model, the target resolution level of the processed image being higher than the current resolution level of the image.

According to another aspect of the present disclosure, a system for image processing is provided. The system may include a storage device storing a set of instructions; and at least one processor in communication with the storage device. When executing the set of instructions, the at least one processor may be configured to direct the system to perform operations including: obtaining initial k-space data generated by a magnetic resonance imaging device; generating first processed k-space data by padding k space of the initial k-space data with predetermined data; generating second processed k-space data based on the initial k-space data, an image associated with the second processed k-space data having a higher resolution than an initial image associated with the initial k-space data; determining, based on the initial image, a first weight matrix corresponding to the first processed k-space data and a second weight matrix corresponding to the second processed k-space data; generating target k-space data based on the first processed k-space data, the second processed k-space data, the first weight matrix, and the second weight matrix; and/or reconstructing a target image based on the target k-space data.

According to another aspect of the present disclosure, a non-transitory computer readable medium is provided. The non-transitory computer readable medium may include at least one set of instructions for image processing. When executed by one or more processors of a computing device, the at least one set of instructions may cause the computing device to perform a method. The method may include: obtaining an image; determining a current resolution level of the image; determining, based on the current resolution level of the image, from a group of resolution level ranges, a reference resolution level range corresponding to the image; determining a target processing model corresponding to the reference resolution level range; and/or determining a processed image with a target resolution level by processing the image using the target processing model, the target resolution level of the processed image being higher than the current resolution level of the image.

According to another aspect of the present disclosure, a non-transitory computer readable medium is provided. The non-transitory computer readable medium may include at least one set of instructions for image processing. When executed by one or more processors of a computing device, the at least one set of instructions may cause the computing device to perform a method. The method may include: obtaining initial k-space data generated by a magnetic resonance imaging device; generating first processed k-space data by padding k space of the initial k-space data with predetermined data; generating second processed k-space data based on the initial k-space data, an image associated with the second processed k-space data having a higher resolution than an initial image associated with the initial k-space data; determining, based on the initial image, a first weight matrix corresponding to the first processed k-space data and a second weight matrix corresponding to the second processed k-space data; generating target k-space data based on the first processed k-space data, the second processed k-space data, the first weight matrix, and the second weight matrix; and/or reconstructing a target image based on the target k-space data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 8 is a flowchart illustrating an exemplary process for generating a target processing model according to some embodiments of the present disclosure;

FIG. 9 is a schematic diagram illustrating an exemplary process for obtaining a plurality of sample images with relatively low resolution levels and a plurality of sample images with relatively high resolution levels according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
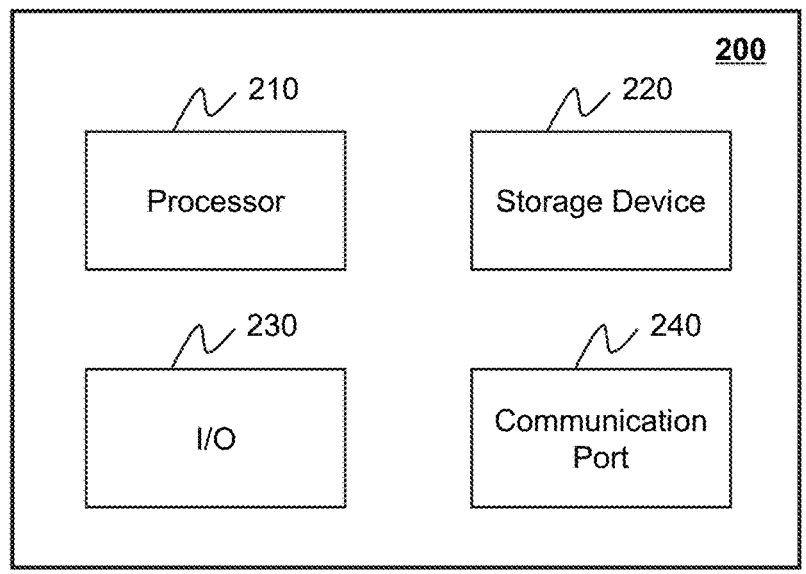
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be merged with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging and/or treatment, such as for disease diagnosis, treatment or research purposes. In some embodiments, the systems may include a magnetic resonance imaging (MRI) system, a radiotherapy (RT) system, a computed tomography (CT) system, an emission computed tomography (ECT) system, an X-ray photography system, a positron emission tomography (PET) system, or the like, or any combination thereof. For illustration purposes, the disclosure describes systems and methods for radiotherapy.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "anatomical structure" in the present disclosure may refer to gas (e.g., air), liquid (e.g., water), solid (e.g., stone), cell, tissue, organ of a subject, or any combination thereof, which may be displayed in an image (e.g., a planning image, or a treatment image, etc.) and really exist in or on the subject's body. The term "region," "location," and "area" in the present disclosure may refer to a location of an anatomical structure shown in the image or an actual location of the anatomical structure existing in or on the subject's body, since the image may indicate the actual location of a certain anatomical structure existing in or on the subject's body.

Imaging technology (e.g., magnetic resonance imaging (MRI)) has been widely employed in medical imaging. An MRI system may include a magnet assembly, a gradient coil assembly, a radiofrequency (RF) coil assembly, an image reconstruction module, or the like, or a combination thereof. The signals collected by the RF coil assembly may be converted into digital signals through analog-to-digital conversion, and the digital signals may be filled into k space. The acquisition and filling of the k-space data may be directly related to the resolution of magnetic resonance images. Under the same field of view (FOV), the more pixels in the phase encoding direction, the smaller the pixel size in the phase encoding direction, and the higher the spatial resolution of the image(s). Similarly, if more sampling points are collected in the process of magnetic resonance echo signal acquisition, more pixels may be generated in the frequency encoding direction of the image(s), the pixel size may be smaller, and the spatial resolution of the image(s) may be higher.

An aspect of the present disclosure relates to systems and methods for generating an image with a relatively high resolution level (e.g., a super resolution level). The systems and methods may obtain an image. The systems and methods may determine a current resolution level of the image. The systems and methods may determine, based on the current resolution level of the image, from a group of resolution level ranges, a reference resolution level range corresponding to the image. The systems and methods may determine a target processing model corresponding to the reference resolution level range. The systems and methods may determine a processed image with a target resolution level by processing the image using the target processing model, the target resolution level of the processed image being higher than the current resolution level of the image. Compared with a conventional imaging processing technology, the systems and methods in the present disclosure may generate a processed image with an improved resolution level by processing the image using the target processing model. A reference resolution level range corresponding to the image may be determined, from the group of resolution level ranges, based on the current resolution level of the image. Each of the group of resolution level ranges may correspond to a processing model. The target processing model corresponding to the reference resolution level range may be used to process the image. The application of the target processing model may improve the resolution of the image, and improve the accuracy of the processed image. According to the systems and methods in the present disclosure, it may be avoided to input images with large resolution differences into a single processing model to generate corresponding image(s) with a relatively low quality. Accordingly, images with different resolution levels may be processed by different processing models, which may improve the quality of the processed image(s).

Alternatively or additionally, the systems and methods may obtain initial k-space data generated by a magnetic resonance imaging device; generate first processed k-space data by padding k space of the initial k-space data with predetermined data; generate second processed k-space data based on the initial k-space data, an image associated with the second processed k-space data having a higher resolution than an initial image associated with the initial k-space data; determine, based on the initial image, a first weight matrix corresponding to the first processed k-space data and a second weight matrix corresponding to the second processed k-space data; generate target k-space data based on the first processed k-space data, the second processed k-space data, the first weight matrix, and the second weight matrix; and/or reconstruct a target image based on the target k-space data. According to the systems and methods in the present disclosure, weight matrixes can be determined automatically, and the synthesis of the first processed k-space data and the second processed k-space data based on the weight matrixes can improve the resolution level of the generated image, and thus, more details can be included in the generated image.

Figure 1:
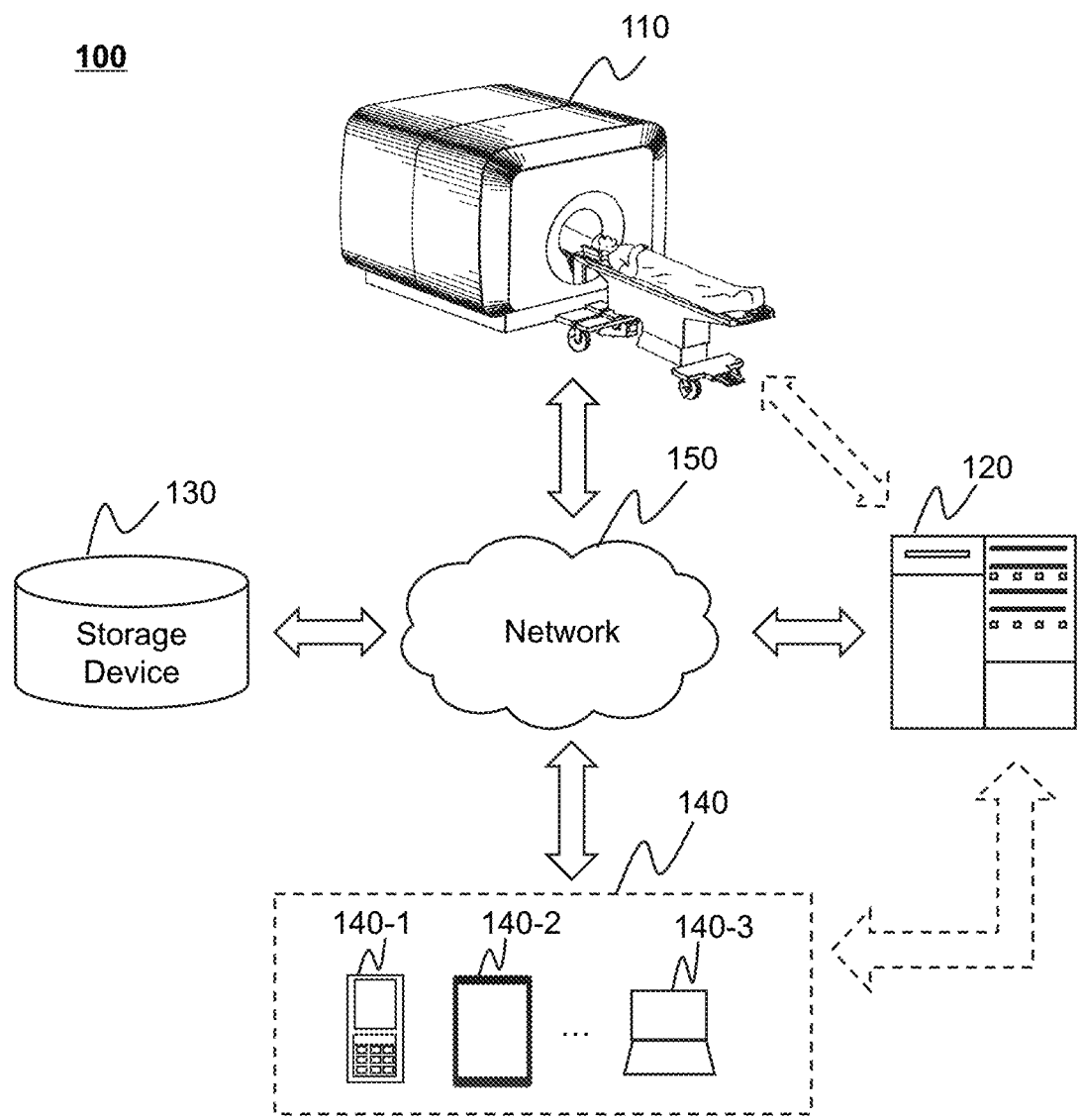
FIG. 1 is a schematic diagram illustrating an exemplary image processing system according to some embodiments of the present disclosure.

FIG. 1 is a schematic diagram illustrating an exemplary image processing system 100 according to some embodiments of the present disclosure. As shown in FIG. 1, the image processing system 100 may include an imaging device 110 (e.g., an MRI scanner), a processing device 120, a storage device 130, one or more terminals 140, and a network 150. In some embodiments, the imaging device 110, the processing device 120, the storage device 130, and/or the terminal(s) 140 may be connected to and/or communicate with each other via a wireless connection, a wired connection, or a combination thereof. The connections between the components in the image processing system 100 may be variable. For example, the imaging device 110 may be connected to the processing device 120 through the network 150. As another example, the imaging device 110 may be connected to the processing device 120 directly.

The imaging device 110 may be configured to scan a subject (or a part of the subject) to acquire image data, such as echo signals (or MRI signals) associated with the subject. Exemplary imaging devices may include a single modality imaging device and/or a multi-modality imaging device. The single modality imaging device may include, for example, an MRI device, a CT device, a DSA device, an IVUS device, or the like. The multi-modality imaging device may include, for example, a PET-MRI device, a SPECT-MRI device, a DSA-MRI device, a PET-CT device, a SPECT-CT device, a DSA-CT device, a DSA-PET device, a CT-guided RT device, etc. For illustration purposes, the following description is described with reference to an MRI device unless specifically stated.

In some embodiments, the imaging device 110 may include, for example, a main magnet, a gradient coil (or also referred to a spatial encoding coil), a radio frequency (RF) coil, etc. In some embodiments, the imaging device 110 may be directed to select an anatomical slice of a subject along a slice selection direction and scan the anatomical slice to acquire a plurality of echo signals from the slice. During the scan, spatial encoding within the slice may be implemented by spatial encoding coils (e.g., an X coil and/or a Y coil) along a phase encoding direction and a frequency encoding direction. The echo signals may be sampled and the corresponding sampled data may be stored into k space for image reconstruction. For illustration purposes, the slice selection direction herein may correspond to a Z direction or a Kz direction in the k space; the phase encoding direction may correspond to a Y direction or a Ky direction in the k space; and the frequency encoding direction may correspond to an X direction or a Kx direction in the k space. It should be noted that the slice selection direction, the phase encoding direction, and the frequency encoding direction may be modified according to actual needs, and the modification(s) do not depart from the scope of the present disclosure.

In some embodiments, the imaging device 110 may be a permanent magnet MRI scanner, a superconducting electromagnet MRI scanner, or a resistive electromagnet MRI scanner, etc., according to types of the main magnet. In some embodiments, the MRI scanner 110 may be a high-field MRI scanner, a mid-field MRI scanner, and a low-field MRI scanner, etc., according to the intensity of the magnetic field.

The subject scanned by the imaging device 110 may be biological or non-biological. For example, the subject may include a patient, a man-made object, etc. As another example, the subject may include a specific portion, organ, tissue, and/or a physical point of the patient. Merely by way of example, the subject may include head, brain, neck, body, shoulder, arm, thorax, cardiac, stomach, blood vessel, soft tissue, knee, feet, or the like, or a combination thereof.

The processing device 120 may process data and/or information obtained from the imaging device 110, the storage device 130, and/or the terminal(s) 140. For example, the processing device 120 may determine a current resolution level of an image. As another example, the processing device 120 may determine a target processing model corresponding to a reference resolution level range by model training.

In some embodiments, the target processing model (e.g., a trained model) may be generated by a processing device, while the application of the model may be performed on a different processing device. In some embodiments, the model may be generated by a processing device of a system different from the image processing system 100 or a server different from the processing device 120 on which the application of the model is performed. For instance, the model may be generated by a first system of a vendor who provides and/or maintains such a model, while the generation of the processed image with a target resolution level based on the provided model may be performed on a second system of a client of the vendor. In some embodiments, the application of the model may be performed online in response to a request for determining a processed image with a target resolution level. In some embodiments, the model may be determined or generated offline.

In some embodiments, the model may be determined and/or updated (or maintained) by, e.g., the manufacturer of the imaging device 110 or a vendor. For instance, the manufacturer or the vendor may load the model into the image processing system 100 or a portion thereof (e.g., the processing device 120) before or during the installation of the imaging device 110 and/or the processing device 120, and maintain or update the model from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 150. The program may include a new model (e.g., a newly trained model) or a portion of a model that substitute or supplement a corresponding portion of the model.

In some embodiments, the processing device 120 may be a single server or a server group. The server group may be centralized or distributed. In some embodiments, the processing device 120 may be local or remote. For example, the processing device 120 may access information and/or data from the imaging device 110, the storage device 130, and/or the terminal(s) 140 via the network 150. As another example, the processing device 120 may be directly connected to the imaging device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as described in connection with FIG. 2.

The storage device 130 may store data, instructions, and/or any other information. In some embodiments, the storage device 130 may store data obtained from the imaging device 110, the processing device 120, and/or the terminal(s) 140. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or a combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). In some embodiments, the storage device 130 may be implemented on a cloud platform as described elsewhere in the disclosure.

In some embodiments, the storage device 130 may be connected to the network 150 to communicate with one or more other components in the image processing system 100 (e.g., the imaging device 110, the processing device 120, and/or the terminal(s) 140). One or more components of the image processing system 100 may access the data or instructions stored in the storage device 130 via the network 150. In some embodiments, the storage device 130 may be part of the processing device 120 or the terminal(s) 140.

The terminal(s) 140 may be configured to enable a user interaction between a user and the image processing system 100. For example, the terminal(s) 140 may receive an instruction to cause the imaging device 110 to scan the subject from the user. As another example, the terminal(s) 140 may receive a processing result (e.g., a slice image representative of a slice location of the subject) from the processing device 120 and display the processing result to the user. In some embodiments, the terminal(s) 140 may be connected to and/or communicate with the imaging device 110, the processing device 120, and/or the storage device 130. In some embodiments, the terminal(s) 140 may include a mobile device 140-1, a tablet computer 140-2, a laptop computer 140-3, or the like, or a combination thereof. For example, the mobile device 140-1 may include a mobile phone, a personal digital assistant (PDA), a gaming device, a navigation device, a point of sale (POS) device, a laptop, a tablet computer, a desktop, or the like, or a combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120 or the imaging device 110.

The network 150 may include any suitable network that can facilitate the exchange of information and/or data for the image processing system 100. In some embodiments, one or more components of the Image processing system 100 (e.g., the imaging device 110, the processing device 120, the storage device 130, the terminal(s) 140, etc.) may communicate information and/or data with one or more other components of the image processing system 100 via the network 150. For example, the processing device 120 may obtain image data (e.g., an echo signal) from the imaging device 110 via the network 150. As another example, the processing device 120 may obtain user instructions from the terminal(s) 140 via the network 150. The network 150 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, or the like, or a combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 150 may include one or more network access points. For example, the network 150 may include wired and/or wireless network access points such as base stations and/or internet exchange points through which one or more components of the image processing system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and characteristics of the exemplary embodiments described herein may be merged in various ways to obtain additional and/or alternative exemplary embodiments. In some embodiments, the image processing system 100 may include one or more additional components and/or one or more components described above may be omitted. Additionally or alternatively, two or more components of the image processing system 100 may be integrated into a single component. For example, the processing device 120 may be integrated into the imaging device 110. As another example, a component of the image processing system 100 may be replaced by another component that can implement the functions of the component. In some embodiments, the storage device 130 may be a data storage including cloud computing platforms, such as a public cloud, a private cloud, a community and hybrid cloud, etc. However, those variations and modifications do not depart the scope of the present disclosure.

FIG. 2 is a schematic diagram illustrating exemplary hardware and/or software components of a computing device 200 according to some embodiments of the present disclosure. The computing device 200 may be used to implement any component of the image processing system 100 as described herein. For example, the processing device 120 and/or the terminal(s) 140 may be implemented on the computing device 200, respectively, via its hardware, software program, firmware, or a combination thereof. Although only one such computing device is shown, for convenience, the computer functions relating to the image processing system 100 as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, data structures, procedures, modules, and functions, which perform particular functions described herein. For example, the processor 210 may process data obtained from the imaging device 110, the terminal(s) 140, the storage device 130, and/or any other component of the image processing system 100 and analyze the data.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data obtained from one or more components of the image processing system 100. In some embodiments, the storage device 220 may store one or more programs and/or instructions to perform exemplary methods described in the present disclosure. For example, the storage device 220 may store a program for the processing device 120 to execute for generating a target processing model and/or processing image(s).

The I/O 230 may input and/or output signals, data, information, etc. In some embodiments, the I/O 230 may enable a user interaction with the processing device 120. In some embodiments, the I/O 230 may include an input device and an output device. The input information received through the input device may be transmitted to another component (e.g., the processing device 120) via, for example, a bus, for further processing. Other types of the input device may include a cursor control device, such as a mouse, a trackball, or cursor direction keys, etc.

The communication port 240 may be connected to a network (e.g., the network 150) to facilitate data communications. The communication port 240 may establish connections between the processing device 120 and the imaging device 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
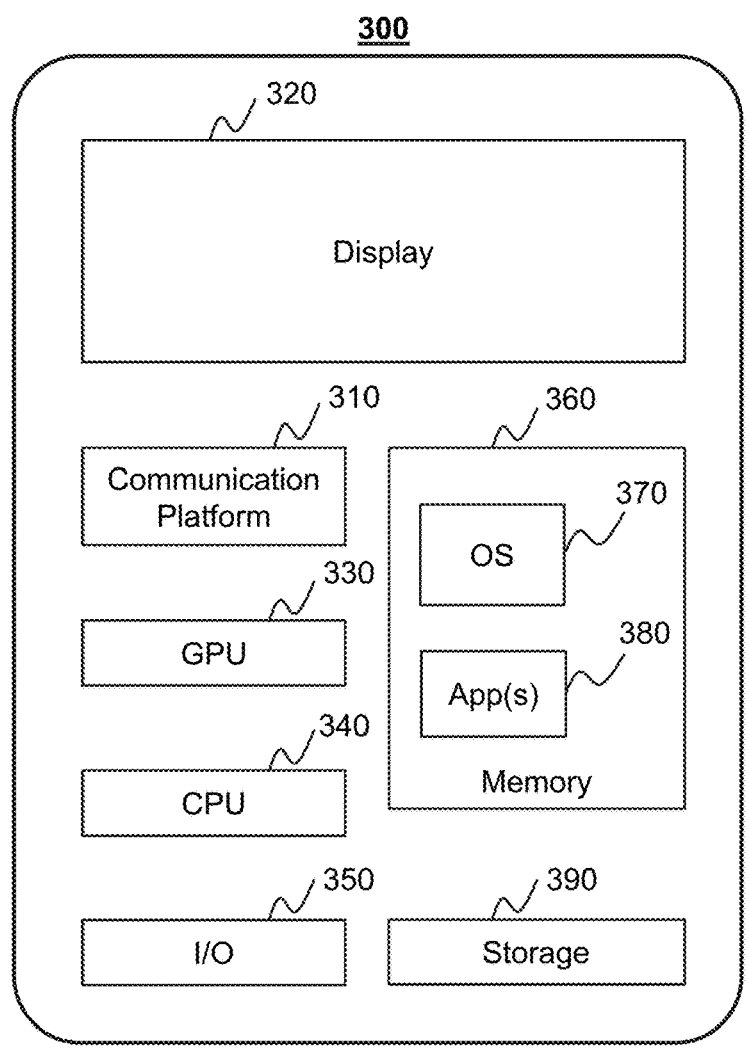
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 according to some embodiments of the present disclosure. In some embodiments, a terminal 140 and/or a processing device 120 may be implemented on a mobile device 300, respectively. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to the image processing system 100. User interactions with the information stream may be achieved via the I/O 350 and provided to the processing device 120 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
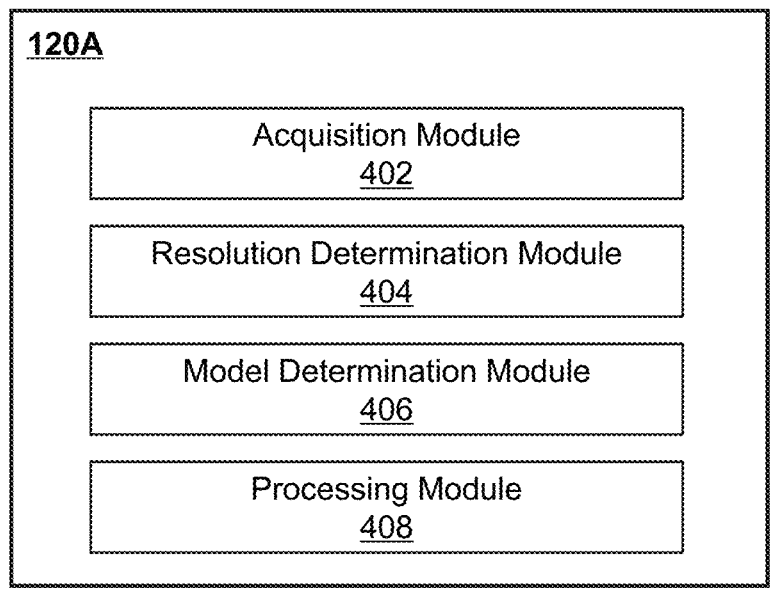
FIGS. 4A and 4B are block diagrams illustrating exemplary processing devices according to some embodiments of the present disclosure.
Figure 4B:
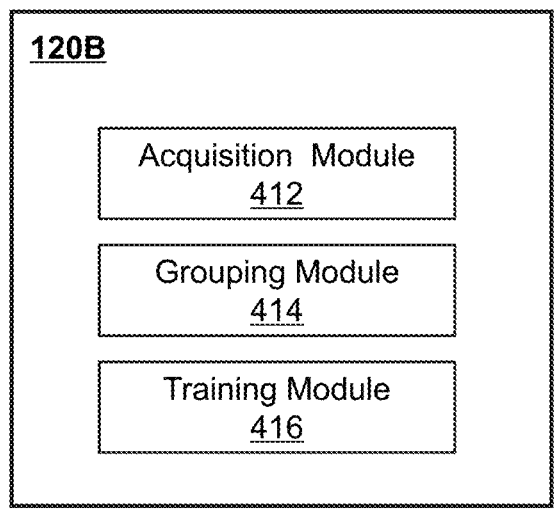

FIGS. 4A and 4B are block diagrams illustrating exemplary processing devices 120A and 120B according to some embodiments of the present disclosure. In some embodiments, the processing devices 120A and 120B may be embodiments of the processing device 120 as described in connection with FIG. 1. The processing device 120A may be configured to process image(s). For example, the processing device 120A may obtain an image associated with MRI image data collected by an imaging device. The processing device 120A may determine a current resolution level. The processing device 120A may determine a reference resolution level range corresponding to the image based on the current resolution level of the image. The processing device 120B may be configured to generate one or more processing models. For example, the processing device 120B may obtain a plurality of sample images with relatively low resolution levels and a plurality of sample images with relatively high resolution levels. The processing device 120B may obtain a plurality of processing models by training each processing model using a corresponding group of sample images with relatively low resolution levels and a corresponding group of sample images with relatively high resolution levels.

In some embodiments, the processing devices 120A and 120B may be respectively implemented on a processing unit (e.g., the processor 210 illustrated in FIG. 2 or the CPU 340 illustrated in FIG. 3). Merely by way of example, the processing device 120A may be implemented on a CPU 340 of a terminal device, and the processing device 120B may be implemented on a computing device 200. As another example, the processing device 120A may be implemented on a computing device of the image processing system 100, while the processing device 120B may be part of a device or a system of the manufacturer of the image processing system 100, or a portion thereof (e.g., the imaging device 110). Alternatively, the processing devices 120A and 120B may be implemented on a same computing device 200 or a same CPU 340. For example, the processing devices 120A and 120B may be implemented on a same computing device 200.

As shown in FIG. 4A, the processing device 120A may include an acquisition module 402, a resolution determination module 404, a model determination module 406, and a processing module 408.

As shown in FIG. 4B, the processing device 120B may include an acquisition module 412, a grouping module 414, and a training module 416.

In some embodiments, the acquisition module 402 may be configured to obtain an image, determine a target processing model (e.g., select, from the plurality of processing models, the target processing model), acquire first data associated with the plurality of sample images with relatively low resolution levels, generate the plurality of sample images with relatively low resolution levels based on the first data, acquire second data associated with the plurality of sample images with relatively high resolution levels (e.g., super resolution levels), generate the plurality of sample images with relatively high resolution levels based on the second data, obtain first data associated with the plurality of sample images with relatively low resolution levels by removing relatively high (spatial) frequency data in k space of the plurality of sample images with relatively high resolution levels, generate first data associated with the plurality of sample images with relatively low resolution levels and second data associated with the plurality of sample images with relatively high resolution levels using a simulation model, or the like, or a combination thereof.

In some embodiments, the resolution determination module 404 may be configured to determine a current resolution level of the image, determine, based on the current resolution level of the image, from a group of resolution level ranges, a reference resolution level range corresponding to the image, determine an upper limit of resolution levels, determine a lower limit of resolution levels, determine a scaling factor, determine the group of resolution level ranges based on the upper limit of resolution levels, the lower limit of resolution levels, and the scaling factor, determine a magnetic field intensity and/or a pulse sequence used in generating the image, determine a group of resolution level ranges based on the magnetic field intensity and/or the pulse sequence, or the like, or a combination thereof.

The model determination module 406 may be configured to determine a target processing model corresponding to the reference resolution level range.

The processing module 408 may be configured to determine a processed image with a target resolution level by processing the image using the target processing model.

The acquisition module 412 may be configured to obtain a plurality of sample images with relatively low resolution levels and a plurality of sample images with relatively high resolution levels, select, from the plurality of processing models, the target processing model corresponding to the reference resolution level range, acquire first data associated with the plurality of sample images with relatively low resolution levels, generate the plurality of sample images with relatively low resolution levels based on the first data, acquire second data associated with the plurality of sample images with relatively high resolution levels, generate the plurality of sample images with relatively high resolution levels or super resolution levels based on the second data, obtain first data associated with the plurality of sample images with relatively low resolution levels by removing relatively high (spatial) frequency data in k space of the plurality of sample images with relatively high resolution levels, generate first data associated with the plurality of sample images with relatively low resolution levels and second data associated with the plurality of sample images with relatively high resolution levels using a simulation model, or the like, or a combination thereof.

The grouping module 414 may be configured to group the plurality of sample images with relatively low resolution levels and group the plurality of sample images with relatively high resolution levels.

The training module 416 may be configured to obtain a plurality of processing models by training each processing model using a corresponding group of sample images with relatively low resolution levels and a corresponding group of sample images with relatively high resolution levels.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 120A and the processing device 120B may share two or more of the modules, and any one of the modules may be divided into two or more units. For instance, the processing devices 120A and 120B may share a same acquisition module, that is, the acquisition module 402 and the acquisition module 412 may be a same module. In some embodiments, the processing device 120A and/or the processing device 120B may include one or more additional modules, such as a storage module (not shown) for storing data. In some embodiments, the processing device 120A and the processing device 120B may be integrated into one processing device 120.

Figure 5:
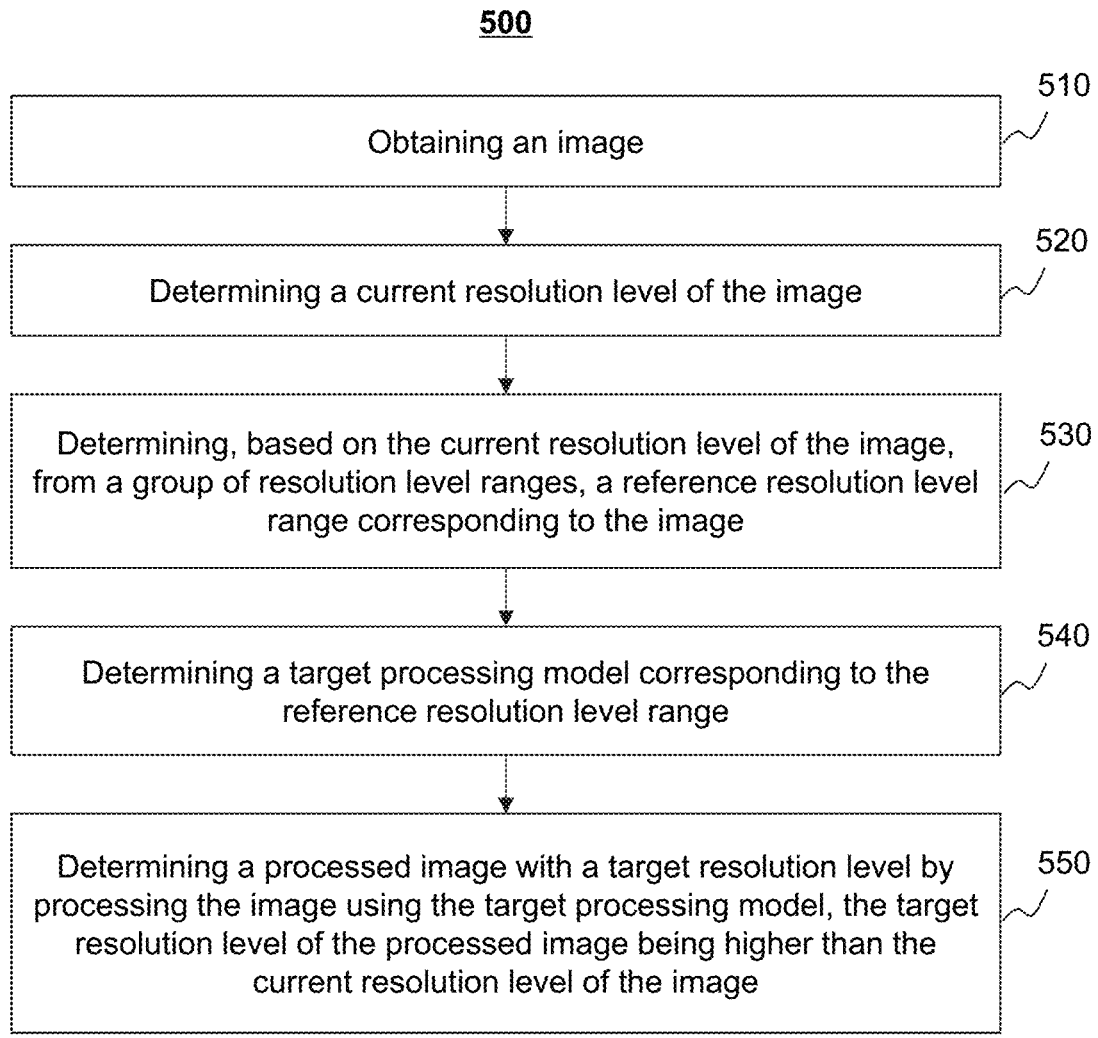
FIG. 5 is a flowchart illustrating an exemplary process for processing an image according to some embodiments of the present disclosure.

FIG. 5 is a flowchart illustrating an exemplary process for processing an image according to some embodiments of the present disclosure. In some embodiments, process 500 may be executed by the image processing system 100. For example, the process 500 may be implemented as a set of instructions (e.g., an application) stored in a storage device (e.g., the storage device 130, the storage device 220, and/or the storage 390). In some embodiments, the processing device 120A (e.g., the processor 210 of the computing device 200, the CPU 340 of the mobile device 300, and/or one or more modules illustrated in FIG. 4A) may execute the set of instructions, and when executing the instructions, the processing device 120A may perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120A (e.g., the acquisition module 402) may obtain an image. The image may be a two-dimensional (2D) image or a three-dimensional (3D) image with a relative low resolution level collected by an imaging device. For example, the image may be an MR image collected by an MRI scanner during an MRI scan or a CT image collected by a CT detector during a CT scan, etc. In some embodiments, the MRI scan may be an ultrashort echo-time MRI scan or a spiral MRI scan. In some embodiments, the processing device 120A may direct the imaging device (e.g., the imaging device 110) to perform the MRI scan and obtain image from the imaging device. Merely by way of example, the processing device 120A may obtain MR data and/or process the MR data in the following operations. In some embodiments, the number of pixels in the k space corresponding to the MR data to be processed along a phase encoding direction or frequency encoding direction may be relatively small, and accordingly, the resolution of the image corresponding to the MR data to be processed may be relatively low. In some embodiments, if the highest frequency of the sampling points in k space corresponding to the image is set properly, the number of pixels in the k space corresponding to the MR data to be processed along a phase encoding direction or frequency encoding direction may be less than a preset threshold.

In some embodiments, the image may be reconstructed based on the image data (e.g., the MR data) generated by the imaging device. In some embodiments, the image may be previously collected and stored in a storage device (e.g., the storage device 130, the storage device 220, an external storage device). The processing device 120A may retrieve the image from the storage device. In some embodiments, the processing device 120A may obtain one or more images in 510.

In 520, the processing device 120A (e.g., the resolution determination module 404) may determine a current resolution level of the image.

The resolution level in the present disclosure may include a spatial resolution. The spatial resolution may refer to the linear spacing of a measurement, or the physical dimension that represents a pixel of the image. If the physical dimension that represents a pixel is relatively small, the spatial resolution may be relatively high. The resolution level of an image may relate to a minimum size of features that can be observed in the image or may be a measure of the sharpness of the image. If the minimum size of features that can be observed in the image is relatively small, the resolution level of the image may be relatively high. The resolution level of an image may relate to the number of pixels per unit length (e.g., per inch) or a size of each pixel of the image. If the number of pixels per unit length is relatively large (or the size of each pixel of the image is relatively small), the resolution level of the image may be relatively high. In some embodiments, a relatively low resolution level may represent a relatively low image quality. A relatively high resolution level may represent a relatively high image quality. In some embodiments, the resolution level of the image may be denoted by a size of a pixel of the image (e.g., 0.1 mm, 0.2 mm, 0.3 mm, 0.4 mm, 0.5 mm, 1 mm, 2 mm, 3 mm, etc.). If the resolution level of the image is denoted by the size of a pixel of the image, and the size of the pixel is relatively small, the resolution level of the image may be relatively high. If the resolution level of the image is denoted by the size of a pixel of the image, and the size of the pixel is relatively large, the resolution level of the image may be relatively low.

In some embodiments, the current resolution level of the image obtained by the processing device 120A described in operation 510 may be lower than a resolution level threshold. Accordingly, the image quality of the obtained image may be relatively low. For example, the resolution level threshold may be denoted by 0.4 mm. The image whose pixel size larger than 0.4 mm may need to be processed in the following operations. In some embodiments, the resolution level threshold may be determined according to a default setting of the image processing system 100 or set manually by a user of the image processing system 100 via, e.g., a terminal (e.g., the terminal 140). In some embodiments, the resolution level threshold may be determined based on the condition. For example, the resolution level threshold may be determined by a doctor based on the current resolution levels of a plurality of images. Alternatively, the resolution level threshold may be determined by the processing device 120A based on an actual condition.

In some embodiments, the current resolution level may be at least one of a resolution along a frequency encoding direction of the image, a resolution along a first phase encoding direction of the image, a resolution along a second phase encoding direction of the image, or a mean value of two or more of the resolution along the frequency encoding direction of the image, the resolution along the first phase encoding direction of the image, and the resolution along the second phase encoding direction of the image. For example, if the obtained image is a 2D image, the current resolution level of the image may be a resolution along a frequency encoding direction of the image, a resolution along a phase encoding direction perpendicular to the frequency encoding direction, or a mean value of the resolution along the frequency encoding direction and the resolution along the phase encoding direction. As another example, if the obtained image is a 3D image, the current resolution level of the image may be a resolution along a first phase encoding direction perpendicular to the frequency encoding direction, the first phase encoding direction may be a phase encoding direction inside slices; alternatively, the current resolution level of the image may be a second phase encoding direction, the second phase encoding direction may be perpendicular to the frequency encoding direction and the first phase encoding direction, and the second phase encoding direction may be a phase encoding direction along different slices.

In some embodiments, the current resolution level of the image may be determined based on sampling points of one or more of a frequency encoding direction, the first phase encoding direction, the second phase encoding direction in k space corresponding to the image to be processed. According to Nyquist's theorem, the current resolution level of the image may be determined by a highest frequency of the sampling points in k space corresponding to the image. The greater the highest frequency of the sampling points in k space, the higher the current resolution level of the image; the lower the highest frequency of the sampling points in k space, the lower the current resolution level of the image.

In 530, the processing device 120A (e.g., the resolution determination module 404) may determine, based on the current resolution level of the image, from a group of resolution level ranges, a reference resolution level range corresponding to the image.

In some embodiments, if two or more images are obtained in 510, the processing device 120A may group the images into at least two groups based on the group of resolution level ranges. In some embodiments, the group of resolution level ranges may be used to distinguish images with different resolution levels. Specifically, the group of resolution level ranges may be used to assemble images with relative similar resolution levels (or small resolution differences) and/or distinguish images with relative different resolution levels (or large resolution differences). For example, the resolution level of images A, B, C and D are denoted by 0.4 mm, 0.8 mm, 1.3 mm, and 1.4 mm, respectively. The group of resolution level ranges may include [0, 0.5 mm), [0.5 mm, 1 mm), and [1 mm, 1.5 mm). The image A may be classified as belong to the resolution level range [0, 0.5 mm), the image B may be classified as belong to the resolution level range [0.5 mm, 1 mm), and the images C and D may be classified as belong to the resolution level range [1 mm, 1.5 mm).

In some embodiments, the group of resolution level ranges may be determined according to a default setting of the image processing system 100 or set manually by a user of the image processing system 100 via, e.g., a terminal (e.g., the terminal 140). For example, the group of resolution level ranges may be determined by a doctor based on current resolution levels of a plurality of images obtained in operation 510. Alternatively, the group of resolution level ranges may be determined by the processing device 120A based on an actual condition.

In some embodiments, the group of resolution level ranges may be determined by the processing device 120A based on information relating to the image processing system (e.g., a scanning protocol, a scanning region, or the like, or a combination thereof). For example, the group of resolution level ranges may be determined based on scan sequences of the image(s) (to be processed) and/or a sampling trajectory of k space corresponding to the image(s). In some embodiments, for a fast spin echo (FSE) sequence, MR signals generated by the FSE sequence may be filled as parallel lines in k space, and a count or number of parallel lines filled in each time of repetition (TR) may be consistent with a count or number of echo chains in the FSE sequence. In some embodiments, multiple resolution level ranges with an equal interval may be set according to a preset resolution interval value. For a periodically rotated overlapping parallel lines enhanced reconstruction (propeller) technology, an echo chain may be collected in each TR period, and the MR signals may be filled in k space at a preset angle. Thus, multiple resolution level ranges with unequal intervals may be set. In some embodiments, for a single excitation echo planar imaging (EPI) sequence, the MR signals collected may have a relatively low intensity and a relatively low spatial resolution, and thus, a relatively large lower limit of resolution levels and a relatively large resolution level threshold may be used to set the group of resolution level ranges. In some embodiments, for a multiple excitation EPI sequence, the MR signals collected may correspond to images with a relatively high image quality and a relatively high signal to noise ratio, and thus, the group of resolution level ranges may be determined based on a relatively small lower limit of resolution levels and a relatively small resolution level threshold. In some embodiments, if the image(s) to be processed are 3D images, the group of resolution level ranges may be determined based on slice thickness(es) of the image(s), and accordingly, the reference resolution level range may be determined based on the slice thickness(es) of the image(s). More descriptions of the determination of the group of resolution level ranges may be found elsewhere in the present disclosure (e.g., FIG. 6 and descriptions thereof).

In some embodiments, the reference resolution level range may indicate a resolution level range of the image with a relatively low resolution. In some embodiments, the reference resolution level range may be used to label an image with a relatively low resolution level. In some embodiments, the reference resolution level range may correspond to one or more images with similar resolution levels. In some embodiments, for each image described in operation 510, the processing device 120A may determine a reference resolution level range from the group of resolution level ranges.

In some embodiments, the processing device 120A may designate, from the group of resolution level ranges, a resolution level range including the current resolution level as the reference resolution level range corresponding to the image. For example, if resolution levels of images A, B, C and D are denoted by 0.4 mm, 0.8 mm, 1.3 mm, and 1.4 mm, respectively, and the group of resolution level ranges include [0, 0.5 mm), [0.5 mm, 1 mm), and [1 mm, 1.5 mm), then the image A may be classified as belong to the resolution level range [0, 0.5 mm), that is, the reference resolution level range of the image A may be [0, 0.5 mm).

In 540, the processing device 120A (e.g., the model determination module 406) may determine a target processing model corresponding to the reference resolution level range.

As used herein, a target processing model refers to a trained model (e.g., a machine learning model, a super-resolution reconstruction model) or an algorithm configured for determining processed images based on its input. For example, the processing device 120A may input the image generated by an imaging device into the target processing model, and the target processing model may output a processed image with a relatively high resolution level. In some embodiments, the resolution of the processed image may be higher than or equal to a resolution level threshold. The resolution level threshold may be the same as the resolution level threshold described in operation 520.

In some embodiments, a resolution level range may correspond to a target processing model, different resolution level ranges may correspond to different target processing models. For example, a reference resolution level range (e.g., [0, 0.5 mm), or the like) may correspond to a target processing model M1. As another example, a reference resolution level range (e.g., [0.5 mm, 1 mm), or the like) may correspond to a target processing model M2. One or more reference resolution level ranges may correspond to one or more target processing models, and images with different reference resolution level ranges may be processed using different target processing models, thereby improving image qualities of corresponding images. In some embodiments, the different target processing models may have different model structures. In some embodiments, the different target processing models may have the same model structure but with different parameters.

In some embodiments, the target processing model may be a machine learning model trained according to a machine learning algorithm. For example, the target processing model may include a neural network model, such as a convolutional neural network (CNN) model (e.g., a full CNN model, V-net model, a U-net model, an AlexNet model, an Oxford Visual Geometry Group (VGG) model, a ResNet model), a generative adversarial network (GAN) model, or the like, or any combination thereof. In some embodiments, the target processing model may include one or more components for feature extraction and/or feature combination, such as a fully convolutional block, a skip-connection block, a residual block, a dense block, or the like, or any combination thereof. Exemplary machine learning algorithms may include an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the target processing model may be a supervised learning algorithm, a semi-supervised learning algorithm, an unsupervised learning algorithm, or the like.

In some embodiments, two or more target processing models corresponding to different reference resolution level ranges may be used in a cascading way, or the two or more target processing models may be configured as a cascade model. For example, a first reference resolution level range may correspond to a first target processing model, a second reference resolution level range may correspond to a second target processing model, and a third reference resolution level range may correspond to a third target processing model. In addition, the resolutions of the first reference resolution level range may be lower than that of the second reference resolution level range, and the resolutions of the second reference resolution level range may be lower than that of the third reference resolution level range. Accordingly, the first target processing model and the second target processing model may be used in a cascade, and then the second target processing model and the third target processing model may be used in a cascade. For instance, an initial image with a resolution of the first reference resolution level range may be processed by the first target processing model and a first processed image with a resolution of the second reference resolution level range may be generated. The first processed image with a resolution of the second reference resolution level range may be processed by the second target processing model and a second processed image with a resolution of the third reference resolution level range may be generated. The second processed image with a resolution of the third reference resolution level range may be processed by the third target processing model and a third processed image may be generated. The first processed image may have a higher resolution than the initial image, the second processed image may have a higher resolution than the first processed image, and the third processed image may have a higher resolution than the second processed image. In comparison with an image processed by using a single processing model that is configured to improve the resolution of the image, the image processed by using two or more target processing models in the cascading way or using a cascade model may have a relatively high resolution level and good image quality.

In some embodiments, the processing device 120A may obtain the target processing model from one or more components of the image processing system 100 (e.g., the storage device 130, the terminals(s) 140) or an external source via a network (e.g., the network 150). For example, the target processing model may be previously trained by a computing device (e.g., the processing device 120B), and stored in a storage device (e.g., the storage device 130, the storage device 220, and/or the storage 390) of the image processing system 100. The processing device 120A may access the storage device and retrieve the target processing model from the storage device. In some embodiments, the target processing model may be trained by a computing device (e.g., the processing device 120B) according to a process 800 described in FIG. 8. Different models may be trained by a same computing device or different computing devices. More descriptions regarding the determination of the processing model may be found elsewhere in the present disclosure. See, e.g., FIG. 8 and relevant descriptions thereof.

In 550, the processing device 120A (e.g., the processing module 408) may determine a processed image with a target resolution level by processing the image using the target processing model. The target resolution level of the processed image may be higher than the current resolution level of the image. The target resolution level may refer to a resolution of the processed image. The target resolution level may be predetermined or not. In some embodiments, the target resolution level may be an ultra-high resolution level which is higher than the current resolution level of the image. The ultra-high resolution level may be higher than a preset resolution level threshold, or the ultra-high resolution level may be higher than the current resolution level multiplied by a certain multiple. For example, the current resolution level of the image is denoted by 1.0 mm, and the target resolution level of the processed image may be denoted by 0.5 mm. In some embodiments, the target resolution level may be included in a resolution level range (with relatively high resolutions) corresponding to the reference resolution level range.

Taking an MRI scan as an example, the processing device 120A may cause the imaging device 110 to generate k-space data by filling MRI scan data into k space. The processing device 120A may further generate an MRI image based on the k-space data, for example, by performing an inverse fast Fourier transformation (IFFT) on the k-space data. In some embodiments, the MRI image generated based on the k-space data may be a processed image with the target resolution level. In some embodiments, the processed image with the target resolution level may be an ultra-resolution reconstructed image.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. Merely by way of example, the operation 520 may be omitted or integrated into 510. In some embodiments, for the image to be processed, the number of pixels in the k space corresponding to the image to be processed along a first phase encoding direction is less than a first threshold, and the number of pixels in the k space corresponding to the image to be processed along a second phase encoding direction is less than a second threshold. The first threshold may be different from the second threshold, i.e., the sampling densities of the MR data of the image in the two phase encoding directions are different. Accordingly, the reference resolution level range may be divided into or include a first reference resolution level range and/or a second reference resolution level range. The first reference resolution level range may be determined according to a resolution along the first phase encoding direction of k space corresponding to the image. The second reference resolution level range may be determined according to a resolution along the second phase encoding direction of k space corresponding to the image. In some embodiments, a first target processing model corresponding to the first reference resolution level range may be determined, and a second target processing model corresponding to the second reference resolution level range may be determined. In some embodiments, a first set of k-space data may be generated by processing the image (or k-space data corresponding to the image) using the first target processing model, and a second set of k-space data may be generated by processing the image (or k-space data corresponding to the image) using the second target processing model. A target set of k-space data may be generated by combining the first set of k-space data and the second set of k-space data, and a target image may be generated based on the target set of k-space data via application of, for example, the inverse Fourier transform.

In some embodiments, the processing of the image (to be processed) may cycle for multiple times and may be performed by using two or more processing models. Merely by way of example, the processing models may include a first processing model corresponding to a first resolution level range for first high resolutions, a second processing model corresponding to a second resolution level range for second high resolutions, and a third processing model corresponding to a third resolution level range for third high resolutions. The first high resolutions are lower than the second high resolutions, and the second high resolutions are lower than the third high resolutions. If the reference resolution level range of the image corresponds to the first high resolutions, the image may be processed by the first processing model, and a processed image with a first high resolution may be generated. The first high resolution may be a relatively low resolution level corresponding to the second high resolutions, and the processed image with the first high resolution may be further processed by the second processing model, and thus, a processed image with a second high resolution may be generated. The second high resolution may be a relatively low resolution level corresponding to the third high resolutions, and the processed image with the second high resolution may be further processed by the third processing model, and thus, a processed image with a third high resolution may be generated. In the processing procedure of some embodiments, the image to be processed may only include k-space data in the central region of k space, and the k-space data in the central region of k space may remain unchanged for the processed image with the first high resolution and the processed image with the second high resolution, and only k-space data in unpadding regions of k space are updated for the processed image with the first high resolution and the processed image with the second high resolution. By processing the image for multiple times, the processed image with an ultra-high resolution level may be generated. Because the k-space data in the central region remain unchanged in the processing procedure, the accuracy of the structure information of the image can be maintained.

Figure 6:
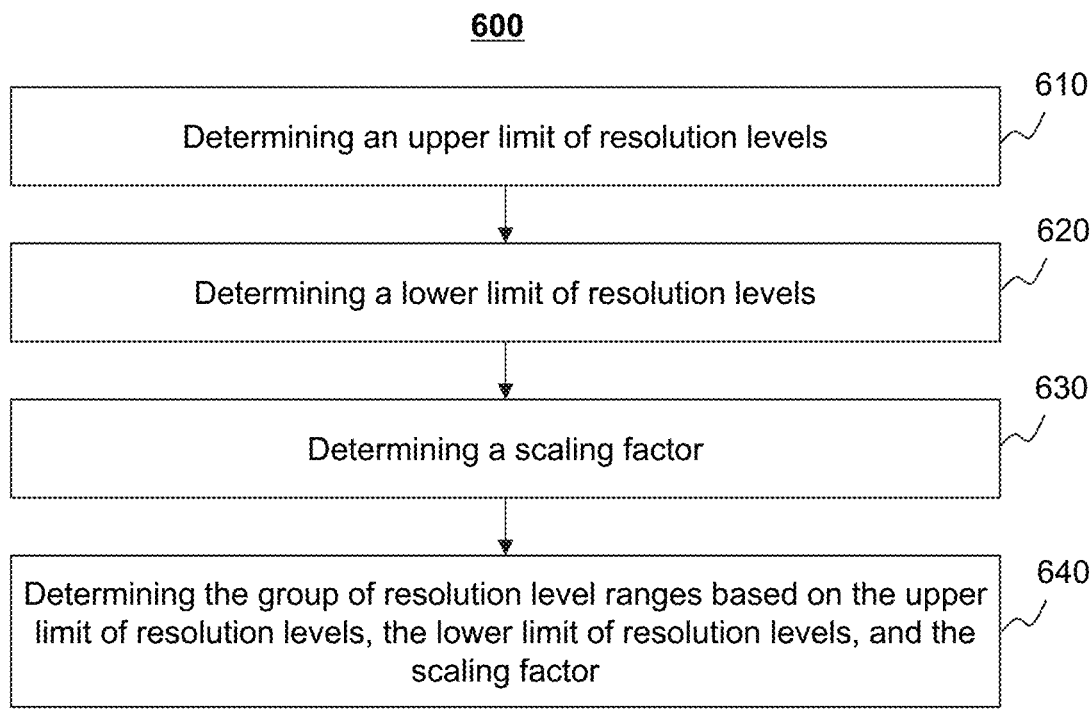
FIG. 6 is a flowchart illustrating an exemplary process for determining a group of resolution level ranges according to some embodiments of the present disclosure.

FIG. 6 is a flowchart illustrating an exemplary process for determining a group of resolution level ranges according to some embodiments of the present disclosure. In some embodiments, process 600 may be executed by the image processing system 100. For example, the process 600 may be implemented as a set of instructions (e.g., an application) stored in a storage device (e.g., the storage device 130, the storage device 220, and/or the storage 390). In some embodiments, the processing device 120A (e.g., the processor 210 of the computing device 200, the CPU 340 of the mobile device 300, and/or one or more modules illustrated in FIG. 4A) may execute the set of instructions, and when executing the instructions, the processing device 120A may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, the process 600 may be performed to achieve at least part of operation 530 as described in connection with FIG. 5.

In 610, the processing device 120A (e.g., the resolution determination module 404) may determine an upper limit of resolution levels. The upper limit of resolution levels may be determined based on the resolution levels of a plurality of images (e.g., a highest resolution level of the plurality of images). In some embodiments, the upper limit of resolution levels may be higher than or equal to the highest resolution level of the plurality of images. Alternatively, the upper limit of resolution levels may be lower than the highest resolution level of the plurality of images. For example, the processing device 120A obtains five images to be processed. The resolution of the five images may be denoted by 1 mm, 3 mm, 5 mm, 6 mm, and 9 mm, respectively. The processing device 120A may determine the upper limit of resolution levels based on the highest resolution level of the images, i.e., denoted by 1 mm. Then the upper limit of resolution levels may be denoted by 1 mm, 0.8 mm, or the like. As another example, the upper limit of resolution levels may be denoted by 1.2 mm, etc. In some embodiments, the upper limit of resolution levels may be determined by the image processing system 100, or may be preset by a user or operator via the terminal(s) 140.

In 620, the processing device 120A (e.g., the resolution determination module 404) may determine a lower limit of resolution levels. The lower limit of resolution levels may be determined based on the resolution levels of the plurality of images (e.g., the lowest resolution level of the plurality of images). The lower limit of resolution levels may be lower than or equal to the lowest resolution level of the plurality of images. Alternatively, the lower limit of resolution levels may be higher than the lowest resolution level of the plurality of images. For example, if the resolutions of the obtained five images are denoted by 1 mm, 3 mm, 5 mm, 6 mm, and 9 mm, respectively, the processing device 120A may determine the lower limit of resolution levels based on the lowest resolution level of the images, i.e., denoted by 9 mm. Then the lower limit of resolution levels may be denoted by 9 mm, 10 mm, etc. As another example, the lower limit of resolution levels may be denoted by 4 mm, etc. In some embodiments, the lower limit of resolution levels may be determined by the image processing system 100, or may be preset by a user or operator via the terminal(s) 140.

In 630, the processing device 120A (e.g., the resolution determination module 404) may determine a scaling factor. In some embodiments, the scaling factor may be a constant, for example, an integer like 1, 2, etc. The scaling factor may be selected based on the upper limit and the lower limit of resolution levels, e.g., a difference between the lower limit and the upper limit of resolution levels. In some embodiments, the scaling factor may be determined by the image processing system 100, or may be preset by a user or operator via the terminal(s) 140.

In 640, the processing device 120A (e.g., the resolution determination module 404) may determine the group of resolution level ranges based on the upper limit of resolution levels, the lower limit of resolution levels, and the scaling factor.

Specifically, the processing device 120A may determine the group of resolution level ranges based on the upper limit of resolution levels, the lower limit of resolution levels, and the scaling factor multiplied by various multipliers. For example, the processing device 120A may determine the upper limit or lower limit of each resolution level range based on the scaling factor multiplied by a certain multiplier.

For example, the processing device 120A may obtain five images, the resolutions of the images may be denoted by 1 mm, 3 mm, 5 mm, 6 mm, and 9 mm, respectively. The upper limit of resolution levels may be denoted by 2 mm, and the lower limit of resolution levels may be denoted by 10 mm. Accordingly, an overall resolution level range may be determined as [2 mm, 10 mm]. If the scaling factor is 2, the group of resolution level ranges may include [2 mm, 4 mm), [4 mm, 8 mm), and [8 mm, 10 mm]. The resolution denoted by 1 mm is excluded from the overall resolution level range, and accordingly, the corresponding image may not need to be processed. The resolution denoted by 3 mm is within the resolution level range [2 mm, 4 mm), and the corresponding image may be processed by a processing model corresponding to the resolution level range [2 mm, 4 mm). The resolutions denoted by 5 mm and 6 mm are within the resolution level range [4 mm, 8 mm), and the corresponding image may be processed by a processing model corresponding to the resolution level range [4 mm, 8 mm). The resolution denoted by 9 mm is within the resolution level range [8 mm, 10 mm], and the corresponding image may be processed by a processing model corresponding to the resolution level range [8 mm, 10 mm].

In some embodiments, the scaling factor may be used to divide a range between the upper limit of resolution levels and the lower limit of resolution levels into at least two resolution level ranges. The scaling factor may represent or indicate a count or number of the resolution level ranges. For example, if the lower limit of resolution levels is denoted by 1.5 mm, the upper limit of resolution levels is denoted by 0 mm, and the scaling factor is 3, then the processing device 120A may determine the group of resolution level ranges as [0, 0.5 mm), [0.5 mm, 1 mm), and [1 mm, 1.5 mm). For four images (e.g., a first image, a second image, a third image, a fourth image) of which resolutions are denoted by 0.4 mm, 0.8 mm, 1.3 mm, and 1.4 mm, respectively, the resolution level range corresponding to the first image may be [0, 0.5 mm), the resolution level range corresponding to the second image may be [0.5 mm, 1 mm), the resolution level range corresponding to the third image and the fourth image may be [1 mm, 1.5 mm).

It should be noted that the above descriptions regarding FIG. 6 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the processing device 120A may determine the group of resolution level ranges with an equal interval based on the upper limit of resolution levels, the lower limit of resolutions, and an interval value. The interval value may be preset or not. The interval value may be determined by the image processing system 100, or may be preset by a user or operator via the terminal(s) 140. Merely by way of example, the processing device 120A may obtain six images of which resolution levels may be denoted by 1 mm, 3 mm, 5 mm, 7 mm, 9 mm, and 12 mm, respectively. The lower limit of resolution levels may be denoted by 10 mm, the upper limit of resolution level may be denoted by 2 mm. The interval value may be 2 mm. The overall resolution level range may be denoted by [2 mm, 10 mm]. The group of resolution level ranges may include [2 mm, 4 mm), [4 mm, 6 mm), [6 mm, 8 mm) and [8 mm, 10 mm]. The resolutions denoted by 1 mm and 12 mm are excluded from the overall resolution level range, and accordingly, the image with a resolution denoted by 1 mm and the image with a resolution denoted by 12 mm may not need to be processed. The image with a resolution denoted by 3 mm may correspond to the resolution level range [2 mm, 4 mm). The image with a resolution denoted by 5 mm may correspond to the resolution level range [4 mm, 6 mm). The image with a resolution denoted by 7 mm may correspond to the resolution level range [6 mm, 8 mm). The image with a resolution denoted by 9 mm may correspond to the resolution level range [8 mm, 10 mm].

In some embodiments, the processing device 120A may determine the group of resolution level ranges based on the upper limit of resolution levels, the lower limit of resolution levels, and the interval value. In some embodiments, the group of resolution level ranges may include at least two resolution level ranges with unequal intervals. For example, the processing device 120A may obtain six images of which resolution levels may be denoted by 1 mm, 3 mm, 5 mm, 7 mm, 9 mm, and 12 mm, respectively. The lower limit of resolution levels may be denoted by 10 mm, the upper limit of resolution levels may be denoted by 2 mm. The group of resolution level ranges may include at least two resolution level ranges with unequal intervals. For instance, the overall resolution level range may be [2 mm, 10 mm], the interval for the resolution level ranges between [2 mm, 6 mm) may be 1 mm, and the interval for the resolution level ranges between [6 mm, 10 mm] may be 2 mm. Accordingly, the group of resolution level ranges may include [2 mm, 3 mm), [3 mm, 4 mm), [4 mm, 5 mm), [6 mm, 8 mm), [6 mm, 8 mm) and [8 mm, 10 mm]. The resolutions denoted by 1 mm and 12 mm are excluded from the overall resolution level range, and accordingly, the image with a resolution denoted by 1 mm and the image with a resolution denoted by 12 mm may not need to be processed. The image with a resolution denoted by 3 mm may correspond to the resolution level range [3 mm, 4 mm). The image with a resolution denoted by 5 mm may correspond to the resolution level range [5 mm, 6 mm). The image with a resolution denoted by 7 mm may correspond to the resolution level range [6 mm, 8 mm). The image with a resolution denoted by 9 mm may correspond to the resolution level range [8 mm, 10 mm].

Figure 7:
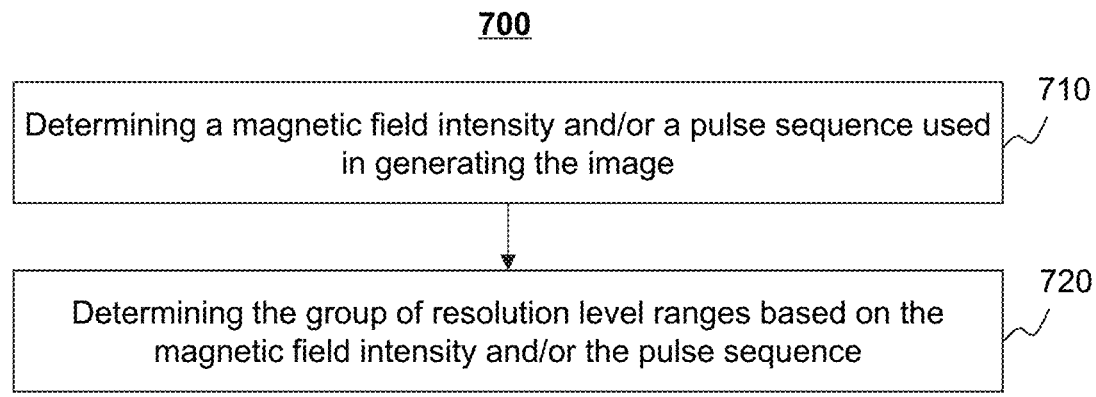
FIG. 7 is a schematic diagram illustrating an exemplary process for determining a group of resolution level ranges according to some embodiments of the present disclosure.

FIG. 7 is a flowchart illustrating another exemplary process for determining a group of resolution level ranges according to some embodiments of the present disclosure. In some embodiments, process 700 may be executed by the image processing system 100. For example, the process 700 may be implemented as a set of instructions (e.g., an application) stored in a storage device (e.g., the storage device 130, the storage device 220, and/or the storage 390). In some embodiments, the processing device 120A (e.g., the processor 210 of the computing device 200, the CPU 340 of the mobile device 300, and/or one or more modules illustrated in FIG. 4A) may execute the set of instructions, and when executing the instructions, the processing device 120A may be configured to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, the process 700 may be performed to achieve at least part of operation 530 as described in connection with FIG. 5.

In 710, the processing device 120A (e.g., the resolution determination module 404) may determine a magnetic field intensity and/or a pulse sequence used in generating the image (e.g., the image obtained in 510).

In some embodiments, the resolution level of an image may relate to the magnetic field intensity and/or pulse sequence used in generating the image. In some embodiments, images generated using different magnetic field intensities and/or different pulse sequences may have different resolution levels. In some embodiments, the magnetic field intensity and/or pulse sequence used in generating the image may be recorded and/or stored in a storage device (e.g., the storage device 130, the storage device 220, and/or the storage 390), and the processing device 120A may retrieve the magnetic field intensity and/or pulse sequence from the storage device.

In 720, the processing device 120A (e.g., the resolution determination module 404) may determine the group of resolution level ranges based on the magnetic field intensity and/or the pulse sequence. In some embodiments, the processing device 120A may determine the upper limit of resolution levels and the lower limit of resolution levels based on the magnetic field intensity and/or the pulse sequence determined in 710, and then determine the group of resolution level ranges based on the upper limit of resolution levels and the lower limit of resolution levels. More descriptions of the determination the group of resolution level ranges based on the upper limit of resolution levels and the lower limit of resolution levels may be found elsewhere in the present disclosure (e.g., FIG. 6 and descriptions thereof). Because the upper limit of resolution levels and the lower limit of resolution levels are determined based on the magnetic field intensity and/or the pulse sequence used in generating the image, the group of resolution level ranges determined based on the upper limit of resolution levels and the lower limit of resolution levels may be more accurate, and the reference resolution level range of the image may be more accurate, and then the processed image generated based on the target processing model corresponding to the reference resolution level range may be more accurate.

Merely by way of example, the processing device 120A may determine different groups of resolution level ranges for a magnetic system with 3.0 Tesla (T) magnetic field intensity and a magnetic system with 1.5 T magnetic field intensity. For the magnetic system with 3.0 T magnetic field intensity, a group of resolution level ranges with relatively low resolutions may include a first range denoted by R~R*F, a second range denoted by R*F~R*F$^2$, a third range denoted by R*F$^2$~R*F$^3$, wherein F represents a scaling factor, R represents an upper limit of resolution levels, H represents a lower limit of resolution levels. Accordingly, a group of resolution level ranges with relatively high resolutions may be determined based on the group of resolution level ranges with relatively low resolutions and the scaling factor (e.g., by dividing the group of resolution level ranges with relatively low resolutions by the scaling factor). For example, if F=2.0, R=0.5 mm, H=8.0 mm, the group of resolution level ranges with relatively low resolutions may include four ranges including, for example, 0.5 mm~1.0 mm, 1.0 mm~2.0 mm, 2.0 mm~4.0 mm, and 4.0 mm~8.0 mm, and the corresponding group of resolution level ranges with relatively high resolutions may include four ranges including, for example, 0.25 mm~0.5 mm, 0.5 mm~1.0 mm, 1.0 mm~2.0 mm, and 2.0 mm~4.0 mm.

For the magnetic system with 1.5 T magnetic field intensity, if F=2.0, R=2 mm and H=16 mm, a group of resolution level ranges with relatively low resolutions may include three ranges including, for example, 2 mm~4 mm, 4 mm~8 mm, and 8 mm~16 mm, and a corresponding group of resolution level ranges with relatively high resolutions may include 1 mm~2 mm, 2 mm~4 mm, and 4 mm~8 mm.

That is, compared with the magnetic resonance system with relatively low field intensity, the magnetic resonance system with relatively high filed intensity may have relatively fine resolution level ranges, and accordingly, more accurate MR images may be obtained based on the magnetic resonance system with relatively high filed intensity. In some embodiments, images (to be processed) with the group of resolution level ranges with relatively low resolutions and images (to be processed) with the corresponding group of resolution level ranges with relatively high resolutions may have the same slice thickness to improve the accuracy of the processed (or reconstructed) image(s).

In some embodiments, the reference resolution level range corresponding to the image to be processed may be determined based on the current resolution level of the image and the group of resolution level ranges. The reference resolution level range may be one of the group of resolution level ranges. More descriptions of the determination of the reference resolution level range may be found elsewhere in the present disclosure (e.g., FIG. 5 and descriptions thereof).

In some embodiment, the field intensity of the magnetic system may be proportional to the resolution of the image. In some embodiments, the resolution of an MR image obtained based on the 3.0 T magnetic system may be 0.8 mm, the reference resolution level range of the image may be determined as 0.5 mm~1.0 mm (a resolution level range with relatively low resolutions), then the image may be processed by using the target processing model corresponding to the reference resolution level range, and a processed image with a relatively high resolution of 0.4 mm may be obtained.

FIG. 8 is a flowchart illustrating an exemplary process for generating a target processing model according to some embodiments of the present disclosure. In some embodiments, process 800 may be executed by the image processing system 100. For example, the process 800 may be implemented as a set of instructions (e.g., an application) stored in a storage device (e.g., the storage device 130, the storage device 220, and/or the storage 390). In some embodiments, the processing device 120B (e.g., the processor 210 of the computing device 200, the CPU 340 of the mobile device 300, and/or one or more modules illustrated in FIG. 4B) may execute the set of instructions and accordingly be directed to perform one or more of the operations of the process 800. In some embodiments, the processing device 120A (e.g., the processor 210 of the computing device 200, the CPU 340 of the mobile device 300, and/or one or more modules illustrated in FIG. 4A) may execute the set of instructions and accordingly be directed to perform one or more of the operations of the process 800. In some embodiments, one or more operations of the process 800 may be performed to achieve at least part of operation 540 as described in connection with FIG. 5. In some embodiments, the process 800 may be performed by another device or system other than the image processing system 100, e.g., a device or system of a vendor of a manufacturer of the imaging device 110. For illustration purposes, the implementation of the process 800 by the processing device 120B is described as an example.

In 810, the processing device 120B (e.g., the acquisition module 412) may obtain a plurality of sample images with relatively low resolution levels and a plurality of sample images with relatively high resolution levels.

In some embodiments, each sample image with a relatively low resolution level may correspond to a sample image with a relatively high resolution level. In some embodiments, the sample image with the relatively low resolution level and the correspond sample image with the relatively high resolution level may relate to a same object, a same detection region of the object, or the like. In the present disclosure, "object" and "subject" are used interchangeably.

In some embodiments, sample images with relatively low resolution levels and sample images with relatively high resolution levels may be previously generated by an imaging device and/or stored in a storage device (e.g., the storage device 130, the storage device 220, the storage 390, or an external database). The processing device 120B may retrieve the sample images with relatively low resolution levels and sample images with relatively high resolution levels from the storage device. Alternatively, sample images with relatively low resolution levels and sample images with relatively high resolution levels may be generated by the processing device 120B.

In some embodiments, the processing device 120B may obtain the plurality of sample images with relatively low resolution levels and the plurality of sample images with relatively high resolution levels from database, storage device or imaging device, etc. For example, the processing device 120B may obtain the sample images with relatively low resolution levels and the sample images with relatively high resolution levels based on an imaging device such as the imaging device 110. More descriptions regarding the obtaining of the sample images with relatively low resolution levels and the sample images with relatively high resolution levels may be found elsewhere in the present disclosure. See, FIGS. 9-11 and relevant descriptions thereof.

In 820, the processing device 120B (e.g., the grouping module 414) may group the plurality of sample images with relatively low resolution levels and group the plurality of sample images with relatively high resolution levels. In some embodiments, each group of sample images with relatively low resolution levels may correspond to a group of sample images with relatively high resolution levels.

In some embodiments, the plurality of sample images with relatively low resolution levels and the plurality of sample images with relatively high resolution levels may be grouped based on at least two groups of resolution level ranges, respectively. For example, the plurality of sample images with relatively low resolution levels may be grouped based on a first group of resolution level ranges, while the plurality of sample images with relatively high resolution levels may be grouped based on a second group of resolution level ranges. In some embodiments, the groups of resolution level ranges may be the same as or similar to that described in connection with operation 530. In some embodiments, the at least two groups of resolution level ranges may be determined the same as or similar to that described in 640 or 720. The grouping manner of sample images with relatively low resolution levels and sample images with relative high resolution levels based on the group(s) of resolution level ranges may be the same as or similar to that described in connection with FIG. 5, 6, or 7.

In some embodiments, a reference resolution level range may be determined for each sample image as described in connection with in FIG. 5. In some embodiments, sample images having a same reference resolution level range may belong to a same group. In some embodiment, each sample image with relatively low resolution level may correspond to each sample with relatively high resolution level. In some embodiments, each resolution level range for sample images with relatively low resolution levels may correspond to a resolution level range for sample images with relatively high resolution levels. In some embodiments, the processing device 120B may group, based on a group of resolution level ranges (e.g., the group of resolution level ranges described in 530), the plurality of sample images with relatively low resolution levels to obtain a plurality of groups of sample images with relatively low resolution levels. For example, the processing device 120B may classify sample images (with relatively low resolution levels) having a same reference resolution level range as a same group. In some embodiments, the processing device 120B may group the plurality of sample images with relatively high resolution levels based on the plurality of groups of sample images with relatively low resolution levels. For example, the processing device 120B may classify sample images (with relatively high resolution levels) corresponding to a same group of sample images with relatively low resolution levels as a same group.

Alternatively, the processing device 120B may group, based on the group of resolution level ranges, the plurality of sample images with relatively high resolution levels to obtain a plurality of groups of sample images with relatively high resolution levels. For example, the processing device 120B may classify sample images (with relatively high resolution levels) having a same reference resolution level range as a same group. In some embodiments, the processing device 120B may group the plurality of sample images with relatively low resolution levels based on the plurality of groups of sample images with relatively high resolution levels. For example, the processing device 120B may classify sample images (with relatively low resolution levels) corresponding to a same group of sample images with relatively high resolution levels as a same group.

In some embodiments, the processing device 120B may set a resolution level range for the sample images with relatively low resolution levels or the sample images with relatively high resolution levels. For example, the processing device 120B may obtain four sample images with relative low resolution levels including image 1, image 2, image 3, and image 4, and corresponding sample images with relative high resolution levels including image 5, image 6, image 7, and image 8. The sample images with relatively low resolution levels may be grouped based on a preset resolution level range, for example, the image 1 and image 2 may be grouped in group A, the image 3 and image 4 may be grouped in group B. Accordingly, the image 5 and image 6 may be grouped in group C, and the image 7 and image 8 may be grouped in group D, wherein the group A corresponds to group C, and the group B corresponds to group D.

In 830, the processing device 120B (e.g., the training module 416) may obtain a plurality of processing models by training each processing model using a corresponding group of sample images with relatively low resolution levels and a corresponding group of sample images with relatively high resolution levels. In some embodiments, each processing model may correspond to a resolution level range, and each resolution level range may correspond to a processing model.

In some embodiments, the each processing model may be an initial processing model. The initial processing model may be trained according to a machine learning algorithm as described elsewhere in this disclosure (e.g., FIG. 5 and the relevant descriptions). For example, the processing device 120B may generate trained processing model(s) according to a supervised machine learning algorithm by performing one or more iterations to iteratively update the model parameter(s) of the initial processing model.

In some embodiments, the initial processing model may be of any type of model (e.g., a machine learning model), for example, a neural network model (e.g., a CNN model, a GAN model), or the like. The initial processing model may include one or more model parameters. For example, the initial processing model may be a CNN model and exemplary model parameters of the initial processing model may include the number (or count) of layers, the number (or count) of kernels, a kernel size, a stride, a padding of each convolutional layer, a loss function, or the like, or any combination thereof. Before or during training, the model parameter(s) of the initial processing model may have their respective initial values. For example, the processing device 120B may initialize parameter value(s) of the model parameter(s) of the initial processing model.

Specifically, the processing device 120B may generate estimated images by inputting the corresponding group of sample images with relative low resolution levels into the each processing model. In some embodiments, if there are differences between the estimated images and the corresponding group of sample images with relatively high resolution levels, the processing device 120B may determine the value of a cost function. The processing device 120B may then determine values of a cost function of the processing model based on the estimated images and the corresponding group of sample images with relatively high resolution levels. For example, the processing device 120B may determine a value of a cost function of the processing model based on each of the estimated images and a corresponding one image of the corresponding group of sample images with relatively high resolution levels.

In some embodiments, the cost function may be used to evaluate the accuracy and reliability of the updated processing model, for example, the smaller the cost function is, the more reliable the updated processing model is. Exemplary cost functions may include an L1 first loss function, a focal first loss function, a log first loss function, a cross-entropy first loss function, a Dice first loss function, etc. The processing device 1206 may further update the value(s) of the model parameter(s) of the updated processing model to be used in a next iteration based on the value of the cost function according to, for example, a backpropagation algorithm. In some embodiments, the cost function may be Mean square error function. For example, the cost function may be expressed as:

$$C(w, b) = \sum \|y(a) - z\|^2, \quad (1)$$

where a denotes an input of the processing model, y(a) denotes an (estimated) output of the processing model, z denotes an expected output of the processing model. $\| \ \|^2$ denotes a two norm operation that is used to determine a loss value of the cost function. w and b are two varibles, and the value of the two varibies may influence the value of the cost function. In some embodiments, w and b may be a weight (or a weight matrix) and a deviation of the network, respectively.

The processing device 1206 may determine whether a termination condition is satisfied based on the value of the cost function. In some embodiments, in response to a determination that the termination condition is not satisfied, the processing device 120B may update one or more parameters of the each processing model. In some embodiments, in response to a determination that the termination condition is satisfied, the processing device 120B may determine (or identify, or confirm) the each processing model based on the updated parameters.

In some embodiments, the one or more iterations may be terminated if a termination condition is satisfied in the current iteration. An exemplary termination condition may be that the value of the cost function obtained in the current iteration is less than a predetermined threshold. Other exemplary termination conditions may include that a certain count of iterations is performed, that the cost function converges such that the differences of the values of the cost function obtained in consecutive iterations are within a threshold, etc. If the termination condition is satisfied in the current iteration, the processing device 120B may designate the updated processing model as the target processing model.

In 840, the processing device 120B (e.g., the acquisition module 412) or the processing device 120A (e.g., the acquisition module 402) may select, from the plurality of processing models, the target processing model corresponding to the reference resolution level range. In some embodiments, the trained processing models may be generated by training the initial processing models using the groups of sample images with relatively low resolution levels and the groups of sample images with relatively high resolution levels. The target processing model corresponding to the reference resolution level range may be generated by training the initial processing model using sample images with resolution levels in the reference resolution level range. For each resolution level range, a corresponding processing model may be trained, and image(s) generated using the trained processing model may be more accurate, clearer, and may meet the requirements of different actual situations.

FIG. 9 is a flowchart illustrating an exemplary process for obtaining a plurality of sample images with relatively low resolution levels and a plurality of sample images with relatively high resolution levels according to some embodiments of the present disclosure. In some embodiments, process 900 may be executed by the image processing system 100. For example, the process 900 may be implemented as a set of instructions (e.g., an application) stored in a storage device (e.g., the storage device 130, the storage device 220, and/or the storage 390). In some embodiments, the processing device 120A or 120B (e.g., the processor 210 of the computing device 200, the CPU 340 of the mobile device 300, and/or one or more modules illustrated in FIG. 4A or 4B) may execute the set of instructions and accordingly be directed to perform the process 900. In some embodiments, one or more operations of the process 900 may be performed to achieve at least part of operation 810 as described in connection with FIG. 8. In some embodiments, the process 900 may be performed by another device or system other than the image processing system 100, e.g., a device or system of a vendor of a manufacturer. For illustration purposes, the implementation of the process 900 by the processing device 120A or 120B is described as an example.

The processing device 120A or 120B may generate the target processing model by training an initial processing model based on groups of sample images with relatively low resolution levels and groups of sample images with relatively high resolution levels using a model training algorithm. The groups of sample images may include training data with relatively low resolutions and training data with relatively high resolutions. The training data with relatively low resolutions and the training data with relatively high resolutions may be acquired from MR signals, and the training data may be referred to as k-space data. An MRI image may be produced from the k-space data arranged into k space via application of, for example, the inverse Fourier transform. In some embodiments, training data with relatively low resolutions and training data with relatively high resolutions may have at least partially the same k-space data. For example, the training data with relatively low resolutions in the central region of k space may be the same as the training data with relatively high resolutions in the central region of k space. In addition, the training data with relatively high resolutions may include more data with relatively high spatial frequency in k space.

In 910, the processing device 120B (e.g., the acquisition module 412) or the processing device 120A (e.g., the acquisition module 402) may acquire first data associated with the plurality of sample images with relatively low resolution levels using a magnetic resonance imaging device.

The first data may be training data corresponding to sample images with relatively low resolution levels. The first data may form a training set. Specifically, a sample subject (e.g., a human body or an animal body, or a phantom (e.g., a water phantom)) may be positioned in the magnetic resonance device. Then under sampling may be performed on the MR signals of the sample subject to obtain the first data. The first data may be k-space data or image data generated based on the k-space data. In some embodiments, under sampling operation may be used to sample a bandpass-filtered signal at a sample rate below its Nyquist rate (e.g., twice the upper cutoff frequency of a bandpass filter). In some embodiments, the under sampling may include bandpass sampling, harmonic sampling, intermediate frequency (IF) sampling, and direct IF-to-digital conversion.

In 920, the processing device 120B (e.g., the acquisition module 412) or the processing device 120A (e.g., the acquisition module 402) may generate the plurality of sample images with relatively low resolution levels based on the first data. If the first data are k-space data, the processing device 120A or 120B may generate the sample images with relatively low resolution levels based on the first data, for example, by performing an inverse fast Fourier transformation (IFFT) on the first data. If the first data are image data generated based on the k-space data, the processing device 120A or 120B may directly obtain the sample images with relatively low resolution levels based on the first data.

In 930, the processing device 120B (e.g., the acquisition module 412) or the processing device 120A (e.g., the acquisition module 402) may acquire second data associated with the plurality of sample images with relatively high resolution levels using the magnetic resonance imaging device. The second data may be training data corresponding to sample images with relatively high resolution levels. The second data may form a training set. Specifically, a sample subject (e.g., a human body or an animal body, or a phantom (e.g., a water phantom)) may be positioned in the magnetic resonance device. Then whole sampling may be performed on the MR signals of the sample subject to obtain the second data. The second data may be k-space data or image data generated based on the k-space data.

In some embodiments, the first data and the second data may have at least partially the same k-space data. For example, the first data in the central region of k space may be the same as the second data in the central region of k space. The second data may include more data with relatively high spatial frequency in k space than the first data. In some embodiment, the first data and the second data may be obtained based on the same subject and/or the same magnetic resonance device. In some embodiments, a scanning field, a detection region, and/or a movement phase of the subject (e.g., a human body or animal body) corresponding to the first data and the second data may be the same.

In 940, the processing device 120B (e.g., the acquisition module 412) or the processing device 120A (e.g., the acquisition module 402) may generate the plurality of sample images with relatively high resolution levels based on the second data. If the second data are k-space data, the processing device 120A or 120B may generate the sample images with relatively high resolution levels based on the second data, for example, by performing an inverse fast Fourier transformation (IFFT) on the second data. If the second data are image data generated based on the k-space data, the processing device 120A or 120B may directly obtain the sample images with relatively high resolution levels based on the second data.

Figure 10:
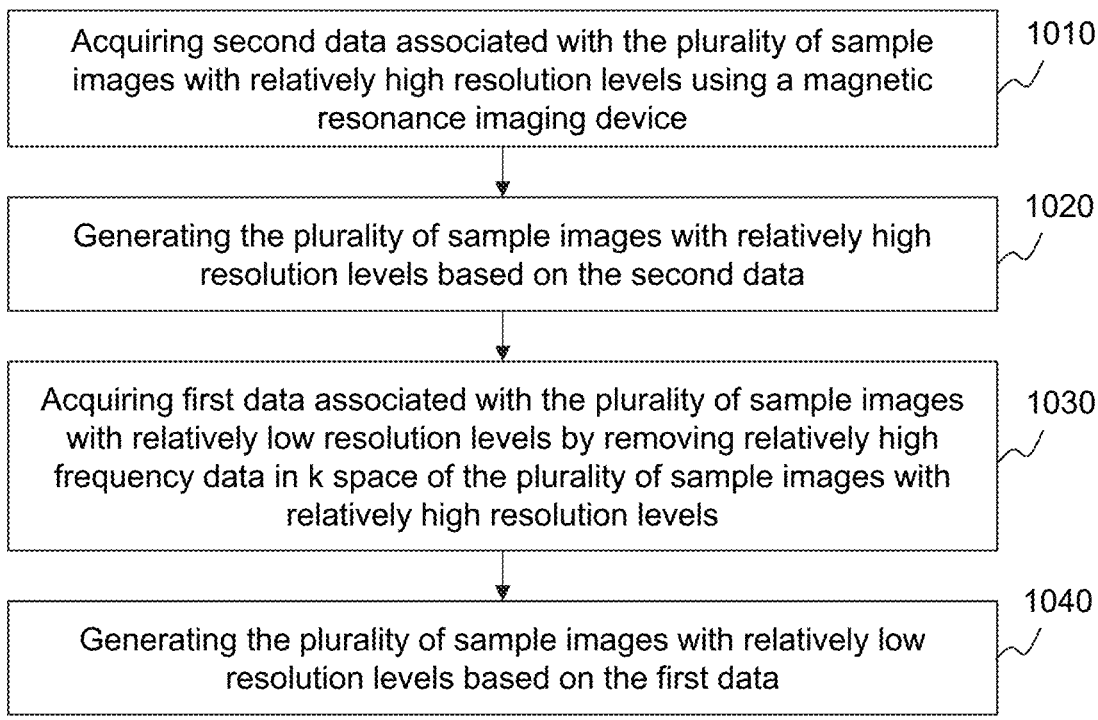
FIG. 10 is a flowchart illustrating an exemplary process for obtaining a plurality of sample images with relatively low resolution levels and a plurality of sample images with relatively high resolution levels according to some embodiments of the present disclosure.

FIG. 10 is a flowchart illustrating an exemplary process for obtaining a plurality of sample images with relatively low resolution levels and a plurality of sample images with relatively high resolution levels according to some embodiments of the present disclosure. In some embodiments, process 1000 may be executed by the image processing system 100. For example, the process 1000 may be implemented as a set of instructions (e.g., an application) stored in a storage device (e.g., the storage device 130, the storage device 220, and/or the storage 390). In some embodiments, the processing device 120A or 120B (e.g., the processor 210 of the computing device 200, the CPU 340 of the mobile device 300, and/or one or more modules illustrated in FIG. 4A or 4B) may execute the set of instructions and accordingly be directed to perform the process 1000. In some embodiments, one or more operations of the process 1000 may be performed to achieve at least part of operation 810 as described in connection with FIG. 8. In some embodiments, the process 1000 may be performed by another device or system other than the image processing system 100, e.g., a device or system of a vendor of a manufacturer. For illustration purposes, the implementation of the process 1000 by the processing device 120A or 120B is described as an example.

In 1010, the processing device 120B (e.g., the acquisition module 412) or the processing device 120A (e.g., the acquisition module 402) may acquire second data associated with the plurality of sample images with relatively high resolution levels using a magnetic resonance imaging device. The operation 1010 may be similar to operation 930. The obtaining of the second data associated with the plurality of sample images with relatively high resolution levels may be performed in a similar manner as the obtaining of the second data as described in connection with operation 930, and the descriptions thereof are not repeated here.

In 1020, the processing device 120B (e.g., the acquisition module 412) or the processing device 120A (e.g., the acquisition module 402) may generate the plurality of sample images with relatively high resolution levels based on the second data. The operation 1020 may be similar to operation 940. The generation of the plurality of sample images with relatively high resolution levels based on the second data may be performed in a similar manner as the generation of the plurality of sample images with relatively high resolution levels as described in connection with operation 940, and the descriptions thereof are not repeated here.

In 1030, the processing device 120B (e.g., the acquisition module 412) or the processing device 120A (e.g., the acquisition module 402) may obtain first data associated with the plurality of sample images with relatively low resolution levels by removing relatively high (spatial) frequency data in k space of the plurality of sample images with relatively high resolution levels.

In some embodiments, data in the central region of k space may correspond to low spatial frequency information, and may relate to the overall image contrast and brightness. After removing the relatively high (spatial) frequency data, the processing device 120A or 120B may obtain relatively low (spatial) frequency data (i.e., the first data associated with the plurality of sample images with relatively low resolution levels).

In 1040, the processing device 120B (e.g., the acquisition module 412) or the processing device 120A (e.g., the acquisition module 402) may generate the plurality of sample images with relatively low resolution levels based on the first data. The operation 1040 may be similar to operation 920. The generation of the plurality of sample images with relatively low resolution levels based on the first data may be performed in a similar manner as the generation of the plurality of sample images with relatively low resolution levels as described in connection with operation 920, and the descriptions thereof are not repeated here.

Figure 11:
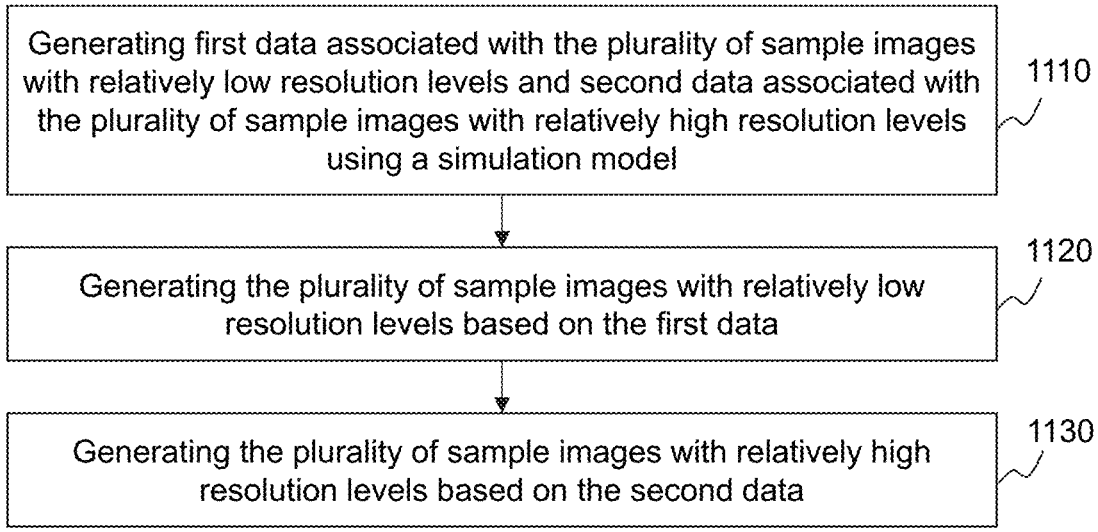
FIG. 11 is a flowchart illustrating an exemplary process for obtaining a plurality of sample images with relatively low resolution levels and a plurality of sample images with relatively high resolution levels according to some embodiments of the present disclosure.

FIG. 11 is a flowchart illustrating an exemplary process for obtaining a plurality of sample images with relatively low resolution levels and a plurality of sample images with relatively high resolution levels according to some embodiments of the present disclosure. In some embodiments, process 1100 may be executed by the image processing system 100. For example, the process 1100 may be implemented as a set of instructions (e.g., an application) stored in a storage device (e.g., the storage device 130, the storage device 220, and/or the storage 390). In some embodiments, the processing device 120A or 120B (e.g., the processor 210 of the computing device 200, the CPU 340 of the mobile device 300, and/or one or more modules illustrated in FIG. 4A or 4B) may execute the set of instructions and accordingly be directed to perform the process 1100. In some embodiments, one or more operations of the process 1100 may be performed to achieve at least part of operation 810 as described in connection with FIG. 8. In some embodiments, the process 1100 may be performed by another device or system other than the image processing system 100, e.g., a device or system of a vendor of a manufacturer. For illustration purposes, the implementation of the process 1100 by the processing device 120A or 120B is described as an example.

In 1110, the processing device 120B (e.g., the acquisition module 412) or the processing device 120A (e.g., the acquisition module 402) may generate first data associated with the plurality of sample images with relatively low resolution levels and second data associated with the plurality of sample images with relatively high resolution levels using a simulation model. In some embodiments, the processing device 120A or 120B may generate a digital model configured to generate data in k space, and generate first data associated with sample images with relatively low resolution and second data associated with sample images with relatively high resolution based on the digital model.

In 1120, the processing device 120B (e.g., the acquisition module 412) or the processing device 120A (e.g., the acquisition module 402) may generate the plurality of sample images with relatively low resolution levels based on the first data. The operation 1120 may be similar to operation 920. The generation of the plurality of sample images with relatively low resolution levels based on the first data may be performed in a similar manner as the generation of the sample images with relatively low resolution described in operation 920, and the descriptions thereof are not repeated here.

In 1130, the processing device 120B (e.g., the acquisition module 412) or the processing device 120A (e.g., the acquisition module 402) may generate the plurality of sample images with relatively high resolution levels based on the second data. The operation 1130 may be similar to operation 940. The generation of the plurality of sample images with relatively high resolution levels based on the second data may be performed in a similar manner as the generation of the sample images with relatively high resolutions described in operation 940, and the descriptions thereof are not repeated here.

It should be noted that the above descriptions regarding FIGS. 8-11 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processes 800-1100 may be accomplished with one or more additional operations not described and/or without one or more of the operations discussed above.

Figure 12:
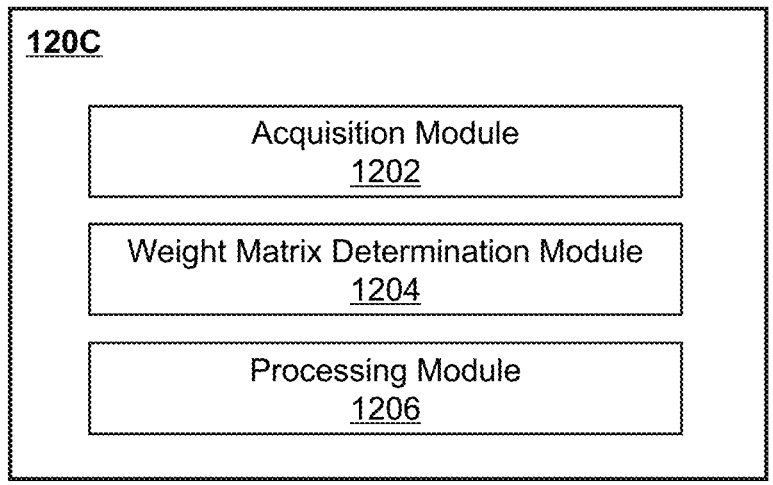
FIG. 12 is a block diagram illustrating an exemplary processing device according to some embodiments of the present disclosure.

FIG. 12 is a block diagram illustrating an exemplary processing device 120C according to some embodiments of the present disclosure. In some embodiments, the processing device 120C may be an embodiment of the processing device 120 as described in connection with FIG. 1. The processing device 120C may be configured to process image(s).

As shown in FIG. 12, the processing device 120C may include an acquisition module 1202, a weight matrix determination module 1204, and a processing module 1206.

The acquisition module 1202 may be configured to obtain initial k-space data generated by a magnetic resonance imaging (MRI) device.

The weight matrix determination module 1204 may be configured to determine, based on the initial image, a first weight matrix corresponding to the first processed k-space data and a second weight matrix corresponding to the second processed k-space data; determine a quality factor of the initial image; determine the first weight matrix and the second weight matrix based on the quality factor of the initial image; determine a noise level of the initial image; determine a signal to noise ratio (SNR) distribution of the initial image by dividing a pixel value of each pixel of the initial image by the noise level; determine a plurality of pixels of the initial image based on an SNR threshold; and/or determine the quality factor of the initial image based on an average value of the SNR values of the plurality of pixels.

The processing module 1206 may be configured to generate first processed k-space data by padding k space of the initial k-space data with predetermined data; generate second processed k-space data based on the initial k-space data; generate target k-space data based on the first processed k-space data, the second processed k-space data, the first weight matrix, and the second weight matrix; reconstruct a target image based on the target k-space data; reconstruct the initial image based on the initial k-space data; determine a current resolution level of the initial image; determine, based on the current resolution level of the initial image, from a group of resolution level ranges, a reference resolution level range corresponding to the initial image; determine a target processing model corresponding to the reference resolution level range; determine a processed image by processing the initial image using the target processing model; and/or obtain the second processed k-space data corresponding to the processed image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 120C and the processing device 120A may share two or more of the modules, and any one of the modules may be divided into two or more units. For instance, the processing devices 120C and 120A may share a same acquisition module, that is, the acquisition module 1202 and the acquisition module 1212 are a same module. As another example, the processing devices 120C and 120A may share a same processing module, that is, the processing module 408 and the processing module 1206 are a same module. In some embodiments, the processing device 120C and/or the processing device 120A may include one or more additional modules, such as a storage module (not shown) for storing data. In some embodiments, the processing device 120C and the processing device 120A may be integrated into one processing device 120.

Figure 13:
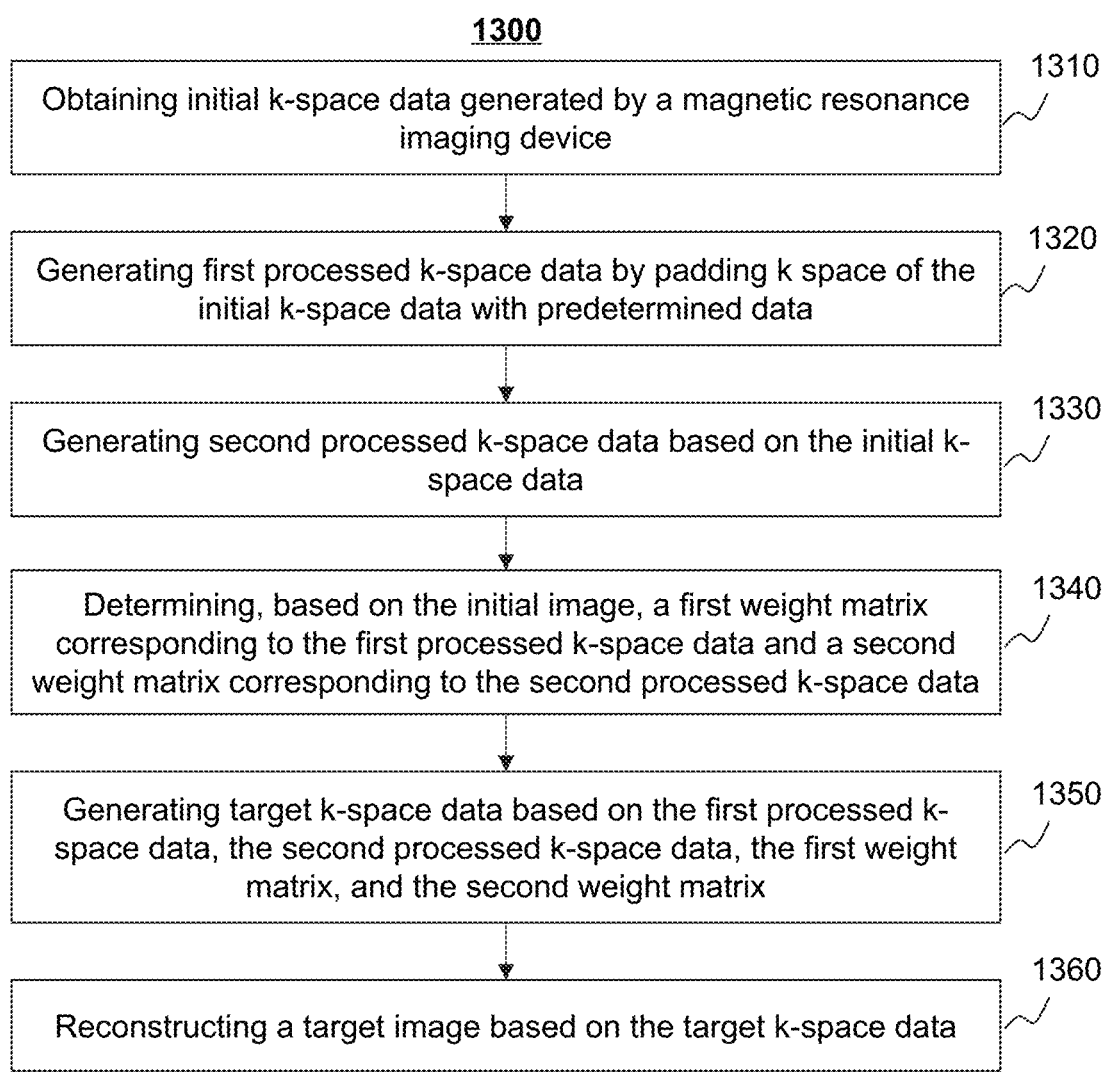
FIG. 13 is a flowchart illustrating an exemplary process for reconstructing a target image according to some embodiments of the present disclosure.

FIG. 13 is a flowchart illustrating an exemplary process for reconstructing a target image according to some embodiments of the present disclosure. In some embodiments, process 1300 may be executed by the image processing system 100. For example, the process 1300 may be implemented as a set of instructions (e.g., an application) stored in a storage device (e.g., the storage device 130, the storage device 220, and/or the storage 390). In some embodiments, the processing device 120C (e.g., the processor 210 of the computing device 200, the CPU 340 of the mobile device 300, and/or one or more modules illustrated in FIG. 12C) may execute the set of instructions, and when executing the instructions, the processing device 120C may be configured to perform the process 1300. The operations of the illustrated process presented below are intended to be illustrative. In some embodiments, the process 1300 may be accomplished with one or more additional operations not described and/or without one or more of the operations discussed. Additionally, the order of the operations of process 1300 illustrated in FIG. 13 and described below is not intended to be limiting.

In 1310, the processing device 120C (e.g., the acquisition module 1202) may obtain initial k-space data generated by a magnetic resonance imaging (MRI) device. The initial k-space data may be k-space data to be processed. The initial k-space data may include data (in a central region of k space) that are generated by the MRI device, and regions (of k space) corresponding to relatively high frequency of k space (of the initial k-space data) may not be padded by any data.

In some embodiments, the k space may correspond to a matrix size of 256 (frequency encoding) multiplied by 256 (phase encoding). Under sampling may be performed along a phase encoding direction, and a matrix with a size of 256 (frequency encoding) multiplied by 128 (phase encoding) may be obtained, that is, a count (or number) of data lines (of k-space data) along the phase encoding direction may be reduced, and the sampled data lines may be filled in a central region of k space. In some embodiments, the filling trajectory of the data lines of the k-space data to be processed may include line by line filling, circuitous filling, spiral filling, or radial filling, etc. The filling trajectory mentioned above is merely provided for the purposes of illustration, and not intended to limit the scope of the present disclosure.

Alternatively or additionally, a weight curve may be preset, and a count (or number) of sampling times required for each phase encoding in k space may be determined according to the preset weight curve. In some embodiments, the central region of k space may have a relatively high weight, and the weight may gradually decrease from the central region to the surrounding region(s) of k space. That is, the count (or number) of sampling times for the central region may be relatively large, the count (or number) of sampling times for the surrounding region(s) may be relatively small, and the count (or number) of sampling times for the edge region(s) of k space may be zero. In some embodiments, the processing device 120C may direct the MRI device to perform MRI scan and obtain the initial k-space data. In some embodiments, after the initial k-space data are generated by the MRI device, the initial k-space data may be stored in a storage device (e.g., the storage device 130, the storage device 220, an external storage device), and the processing device 120C may retrieve the initial k-space data from the storage device.

In 1320, the processing device 120C (e.g., the processing module 1206) may generate first processed k-space data by padding k space of the initial k-space data with predetermined data.

In some embodiments, the predetermined data may be padded in a region of k space encircling a k space range of the initial k-space data such that frequencies corresponding to the predetermined data are higher than frequencies corresponding to the initial k-space data. In some embodiments, the predetermined data may include zero data. The first processed k-space data may be generated by padding zero data in a region of k space encircling a k space range of the initial k-space data. Accordingly, a matrix size of the first processed k-space data is larger than a matrix size of the initial k-space data. In some embodiments, the predetermined data may have other values. The predetermined data may be determined by the image processing system 100, or may be preset by a user or operator via the terminal(s) 140.

Specifically, in some embodiments, before reconstructing an image, the processing device 120C may fill the initial k-space data in the central region of k space, and fill the predetermined data in surrounding region(s) of k space, to obtain, for example, a matrix with 512×512 pixels or 1024×1024 pixels. In some embodiments, the predetermined data may be padded according to a padding operation. Exemplary padding operations may include an intra-layer zero padding interpolation operation or an intra-layer zero padding difference algorithm.

In 1330, the processing device 120C (e.g., the processing module 1206) may generate second processed k-space data based on the initial k-space data. In some embodiments, an image associated with the second processed k-space data may have a higher resolution than an initial image associated with the initial k-space data. In some embodiments, the first processed k-space data and the second processed k-space data may have a same k space range (see FIG. 19), so as to facilitate a fusing of the first processed k-space data and the second processed k-space data.

In some embodiments, the second processed k-space data may be generated based on a processing model. For example, the second processed k-space data may be generated by inputting the initial k-space data into the processing model. As another example, the initial image may be inputted into the processing model, and a processed image may be outputted from the processing model, the processed image may be transformed (e.g., using the Fourier transformation) to obtain the second processed k-space data. In some embodiments, the image associated with the second processed k-space data may be generated based on the initial image according to the operations 520-550. More descriptions regarding generating the second processed k-space data may be found elsewhere in the present disclosure. See, FIG. 16 and relevant descriptions thereof. More descriptions of the processing model may be found elsewhere in the present disclosure (e.g., FIG. 8 and descriptions thereof).

Alternatively, in some embodiments, third k-space data may be generated using a sensitivity encoding (SENSE) technology, a simultaneous acquisition of spatial harmony (SMASH) technology, a generalized auto-calibrating partially parallel acquisition (GRAPPA) technology, or the like. An image associated with the third k-space data may have a higher resolution than the initial image associated with the initial k-space data. Accordingly, the third k-space data instead of the second processed k-space data may be used in operations 1340 and 1350.

In 1340, the processing device 120C (e.g., the weight matrix determination module 1204) may determine, based on the initial image, a first weight matrix corresponding to the first processed k-space data and a second weight matrix corresponding to the second processed k-space data. In some embodiments, in different slices, the first weight matrix and the second weight matrix may be determined, respectively (i.e., different slices may correspond to different first weight matrixes and/or different second weight matrixes). More descriptions of the determination of the first weight matrix and the second weight matrix may be found elsewhere in the present disclosure (e.g., FIG. 14 and descriptions thereof).

In 1350, the processing device 120C (e.g., the processing module 1206) may generate target k-space data based on the first processed k-space data, the second processed k-space data, the first weight matrix, and the second weight matrix. In some embodiment, the target k-space data may be fused k-space data. The first processed k-space data may be multiplied by the first weight matrix, and the second processed k-space data may be multiplied by the second weight matrix. The processing device 120C may generate the target k-space data by fusing the first processed k-space data multiplied by the first weight matrix and the second processed k-space data multiplied by the second weight matrix (see FIG. 20).

In 1360, the processing device 120C (e.g., the processing module 1206) may reconstruct a target image based on the target k-space data.

Compared with the initial image, the reconstructed target image may include more details and have higher resolution. Accordingly, more information of lesions or human tissues may be obtained based on the reconstructed target image. The processing device 120C may generate the target image by, for example, performing an inverse fast Fourier transformation (IFFT) on the target k-space data. In some embodiments, the target image generated based on the target k-space data may be a processed image with a target resolution level. In some embodiments, the target image may have an ultra-high resolution.

Figure 14:
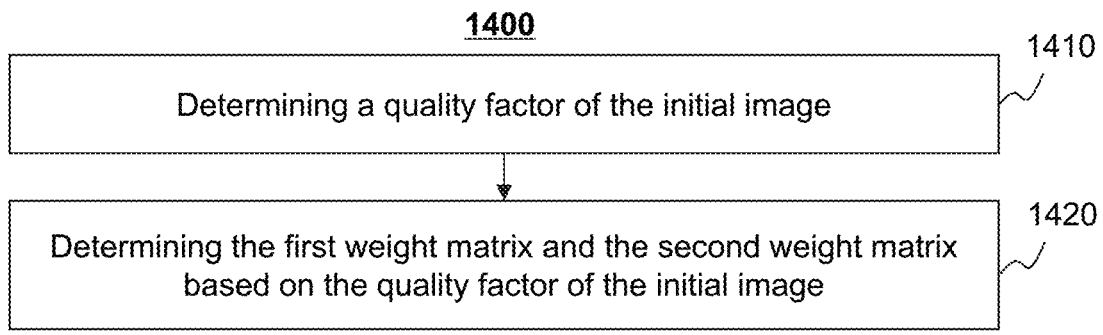
FIG. 14 is a flowchart illustrating an exemplary process for determining a first weight matrix and a second weight matrix according to some embodiments of the present disclosure.

FIG. 14 is a flowchart illustrating an exemplary process for determining a first weight matrix and a second weight matrix according to some embodiments of the present disclosure. In some embodiments, process 1400 may be executed by the image processing system 100. For example, the process 1400 may be implemented as a set of instructions (e.g., an application) stored in a storage device (e.g., the storage device 130, the storage device 220, and/or the storage 390). In some embodiments, the processing device 120C (e.g., the processor 210 of the computing device 200, the CPU 340 of the mobile device 300, and/or one or more modules illustrated in FIG. 12A) may execute the set of instructions, and when executing the instructions, the processing device 120C may be configured to perform the process 1400. The operations of the illustrated process presented below are intended to be illustrative. In some embodiments, the process 1400 may be accomplished with one or more additional operations not described and/or without one or more of the operations discussed. Additionally, the order of the operations of process 1400 illustrated in FIG. 14 and described below is not intended to be limiting.

In 1410, the processing device 120C (e.g., the weight matrix determination module 1204) may determine a quality factor of the initial image.

In some embodiments, the quality factor may refer to or relate to a signal to noise ratio (SNR) that represents a ratio of the signal strength of an image (e.g., the initial image) to the intensity of background random noise. The signal strength may be an average signal intensity of pixels in a region of interest of the image. The noise may be a standard deviation of the signal intensities of the same number of pixels in the region of interest.

In some embodiments, the quality factor may be determined based on the magnetic field intensity of the MRI device that generates the initial image, a pulse sequence used in generating the initial image, a time of repetition (TR) in generating the initial image, a time of echo (TE) in generating the initial image, a count or number of excitations (NEX) in generating the initial image, a slice thickness of the initial image, a system matrix used in reconstructing the initial image, a field of view (FOV) used in reconstructing the initial image, or the like, or any combination thereof.

In some embodiments, the processing device 120C may determine the quality factor of the initial image based on an average value of the SNR values of a plurality of pixels of the initial image. More descriptions regarding the determination of the quality factor of the initial image may be found elsewhere in the present disclosure. See, FIG. 15 and relevant descriptions thereof.

In some embodiments, the processing device 120C may obtain the quality factor of the initial image by inputting the initial k-space data into a trained SNR determination model. Spesically, the processing device 120C may input the initial k-space data into the trained SNR determination model, the SNR determination model may output an SNR value (e.g., an overall SNR value) of the initial image. In some embodiments, a processing device (e.g., the processing device 120, or a processing device external to the image processing system 100) may obtain sample image data (or sample k-space data) labeled with SNR value(s), and input the sample image data (or sample k-space data) into an SNR determination model to train the SNR determination model. The SNR determination model may be trained according to a machine learning algorithm described elsewhere in the present disclosure. In some embodiments, the SNR determination model may be trained similar to the training process of the processing model(s) illustrated in FIG. 8. In some embodiments, the processing device 120C may input image data of the initial image (or the initial k-space data) into the trained SNR determination model, and obtain an output (e.g., the SNR value of the initial image) of the trained SNR determination model. In some embodiments, the processing device 120C may designate the SNR value of the initial image as the quality factor.

In some embodiments, the processing device 120C may determine the quality factor of the initial image based on an artifact level of the initial image. The artifact level may include but not limited to a motion artifact level, a level of artifacts induced by radio frequency interference(s), a level of artifacts induced by reconstruction distortion, or the like, or any combination thereof.

In 1420, the processing device 120C (e.g., the weight matrix determination module 1204) may determine the first weight matrix and the second weight matrix based on the quality factor of the initial image.

In some embodiments, the processing device 120C may determine the second weight matrix based on the quality factor of the initial image and a monotone increasing function. In some embodiments, the processing device 120C may determine the first weight matrix based on the quality factor of the initial image and a monotone decreasing function. Specifically, the processing device 120C may input the quality factor (e.g., the SNR value) into a preset monotone increasing function to obtain the second weight matrix. The processing device 120C may input the quality factor (e.g., the SNR value) into a preset monotone decreasing function to obtain the first weight matrix. For example, the processing device 120C may input the SNR value into a preset monotone increasing function (e.g., $F2=Q^2$), and obtain the second weight matrix, wherein F2 denotes the second weight matrix, Q denotes the SNR value of the initial image. As another example, the processing device 120C may input the SNR value of the initial image into a preset monotone decreasing function (e.g., $F1=1/Q^2$), and obtain the first weight matrix, wherein F1 denotes the first weight matrix, Q denotes the SNR value of the initial image. Thus, the first weight matrix corresponding to the first processed k-space data and the second weight matrix corresponding to the second processed k-space data may be determined automatically, and the quality and efficiency of the fusing of the first processed k-space data and the second processed k-space data may be improved.

Figure 15:
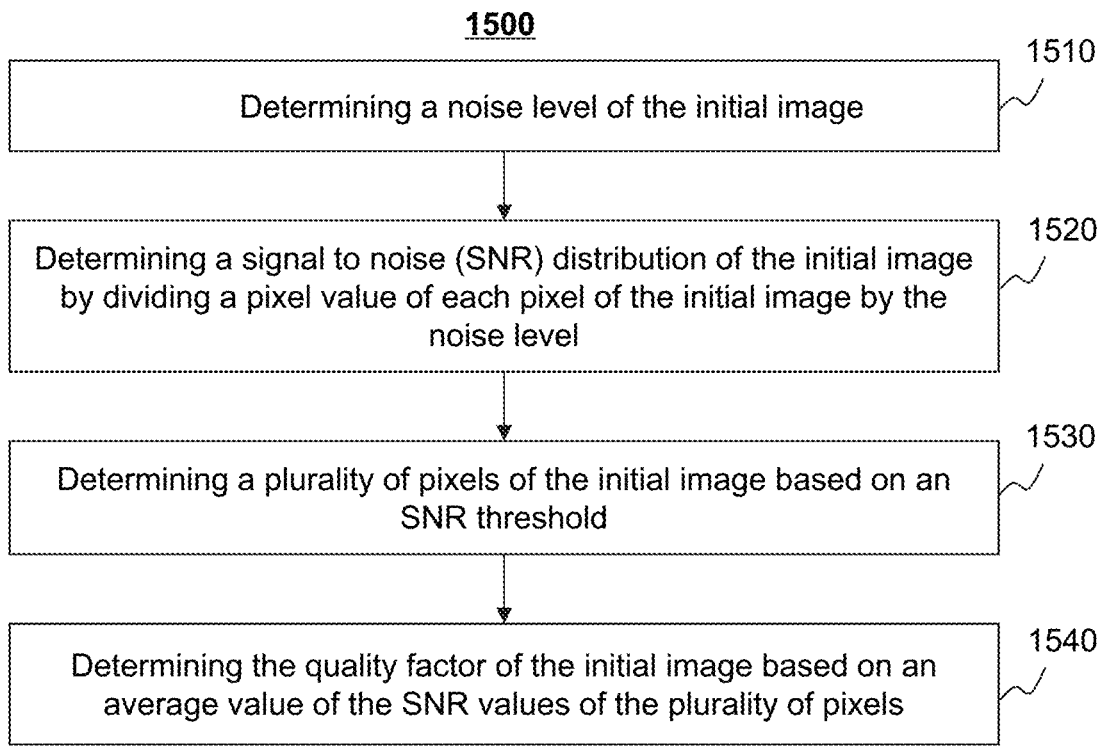
FIG. 15 is a flowchart illustrating an exemplary process for determining a quality factor according to some embodiments of the present disclosure.

FIG. 15 is a flowchart illustrating an exemplary process for determining a quality factor according to some embodiments of the present disclosure. In some embodiments, process 1500 may be executed by the image processing system 100. For example, the process 1500 may be implemented as a set of instructions (e.g., an application) stored in a storage device (e.g., the storage device 130, the storage device 220, and/or the storage 390). In some embodiments, the processing device 120C (e.g., the processor 210 of the computing device 200, the CPU 340 of the mobile device 300, and/or one or more modules illustrated in FIG. 12A) may execute the set of instructions, and when executing the instructions, the processing device 120C may be configured to perform the process 1500. The operations of the illustrated process presented below are intended to be illustrative. In some embodiments, the process 1500 may be accomplished with one or more additional operations not described and/or without one or more of the operations discussed. Additionally, the order of the operations of process 1500 illustrated in FIG. 15 and described below is not intended to be limiting.

In 1510, the processing device 120C (e.g., the weight matrix determination module 1204) may determine a noise level of the initial image.

In some embodiments, the processing device 120C may determine the noise level of the initial image based on a portion of the initial k-space data located on one or more edges of k space range of the initial k-space data. In some embodiments, the portion of the initial k-space data may include a preset number of data points. Specifically, the processing device 120C may obtain a preset number of data points located on one or more edge rows and/or edge columns of the k-space data of the initial image, and determine the noise level of the initial image based on the data points. The noise level may be determined based on the following Equation (1):

$$NoiseLevel = \sqrt{\sum_j (x_j - \bar{x})/(2M-1)}, \quad (1)$$

where $x_j$ denotes the real or imaginary parts of M complex data points, the number of the data points may be 2M. $\bar{x}$ denotes the mean value of the real and/or imaginary parts of all data points, j denotes the serial number of complex data points, and $1 \leq j \leq 2M$.

Alternatively, the processing device 120C may determine the noise level of the initial image based on a preset count (or number) of data points of noise data that are generated by turning off radiofrequency (RF) pulses. Specifically, the processing device 120C may obtain a preset count (or number) of data points of noise data, and determine the noise level of the initial image based on the noise data. In some embodiments, a scan sequence that is the same as that used in generating the initial image may be used to generate one or more sets of noise data by turning off RF pulse(s), and the noise level may be estimated according to Equation (1), and then the SNR value of the initial image may be determined.

In 1520, the processing device 120C (e.g., the weight matrix determination module 1204) may determine a signal to noise ratio (SNR) distribution of the initial image by dividing a pixel value of each pixel of the initial image by the noise level. In some embodiments, the SNR distribution may include SNR values of at least a portion of pixels of the initial image.

In 1530, the processing device 120C (e.g., the weight matrix determination module 1204) may determine a plurality of pixels of the initial image based on an SNR threshold. In some embodiments, an SNR value of each of the plurality of pixels may be larger than the SNR threshold.

In some embodiment, the SNR threshold may be set as an upper limit value of the SNR. In some embodiments, the SNR threshold may be determined according to a default setting of the image processing system 100 or set manually by a user of the image processing system 100 via, e.g., a terminal (e.g., the terminal 140). For example, the SNR threshold may be determined by a doctor based on the image quality of a plurality of images. Alternatively, the SNR threshold may be determined by the processing device 120C based on an actual condition.

In 1540, the processing device 120C (e.g., the weight matrix determination module 1204) may determine the quality factor of the initial image based on an average value of the SNR values of the plurality of pixels.

In some embodiments, the processing device 120C may obtain SNR values of pixels exceeding a preset threshold based on the SNR distribution, and obtain the SNR value of the initial image based on an average value of the SNR values of pixels exceeding the preset threshold. The SNR value of the initial image determined as illustrated above may be more accurate. For example, the average value of the SNR values of pixels that are certain times (e.g., five times, six times, etc.) higher than the noise level may be determined as the SNR value.

Figure 16:
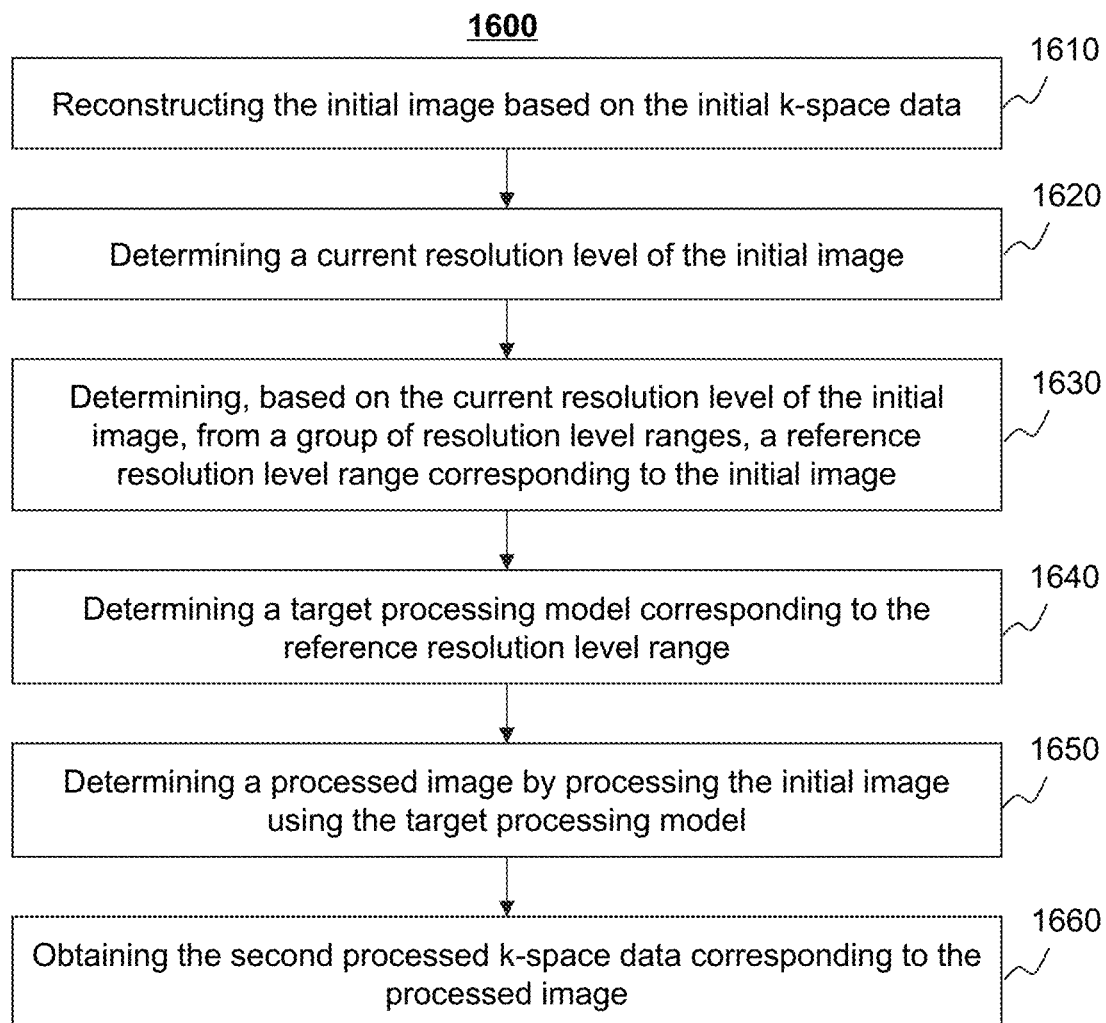
FIG. 16 is a flowchart illustrating an exemplary process for generating second processed k-space data based on the initial k-space data according to some embodiments of the present disclosure.

FIG. 16 is a flowchart illustrating an exemplary process for generating second processed k-space data based on the initial k-space data according to some embodiments of the present disclosure. In some embodiments, process 1600 may be executed by the image processing system 100. For example, the process 1600 may be implemented as a set of instructions (e.g., an application) stored in a storage device (e.g., the storage device 130, the storage device 220, and/or the storage 390). In some embodiments, the processing device 120C (e.g., the processor 210 of the computing device 200, the CPU 340 of the mobile device 300, and/or one or more modules illustrated in FIG. 12) may execute the set of instructions, and when executing the instructions, the processing device 120C may be configured to perform the process 1600. The operations of the illustrated process presented below are intended to be illustrative. In some embodiments, the process 1600 may be accomplished with one or more additional operations not described and/or without one or more of the operations discussed. Additionally, the order of the operations of process 1600 illustrated in FIG. 16 and described below is not intended to be limiting.

In 1610, the processing device 120C (e.g., the processing module 1206) may reconstruct the initial image based on the initial k-space data. The processing device 120C may generate the initial image based on the initial k-space data by performing, for example, an inverse fast Fourier transformation (IFFT) on the initial k-space data. The generation of the initial image based on the initial k-space data may be performed in a similar manner in connection with operation 1360.

In 1620, the processing device 120C (e.g., the processing module 1206) may determine a current resolution level of the initial image. The determination of the current resolution level of the initial image may be performed in a similar manner as the determination of the current resolution level of an image described in connection with operation 520.

In 1630, the processing device 120C (e.g., the processing module 1206) may determine, based on the current resolution level of the initial image, from a group of resolution level ranges, a reference resolution level range corresponding to the initial image.

In some embodiments, the group of resolution level ranges and the reference level range may be similar to the group of resolution level ranges and reference level range as described in operation 530. The determination, based on the current resolution level of the initial image, from a group of resolution level ranges, a reference resolution level range corresponding to the initial image may be performed in a similar manner as the determination, based on the current resolution level of the initial image, from a group of resolution level ranges, a reference resolution level range described in connection with operation 530.

In 1640, the processing device 120C (e.g., the processing module 1206) may determine a target processing model corresponding to the reference resolution level range. The determination of the target processing model may be similar to those descried in 540.

In 1640, the processing device 120C (e.g., the processing module 1206) may determine a processed image by processing the initial image using the target processing model.

In some embodiments, the processed image may have a target resolution level. More descriptions of the target resolution level and the processing of the initial image using the target processing model may be found elsewhere in the present disclosure (e.g., operation 550 in FIG. 5 and descriptions thereof). In some embodiments, operations 1620-1650 may be performed similar to operations 520-550.

In 1650, the processing device 120C (e.g., the processing module 1206) may obtain the second processed k-space data corresponding to the processed image. In some embodiments, the processing device 120C may obtain the second processed k-space data by performing, e.g., a Fourier transformation on the processed image.

Figure 17A:
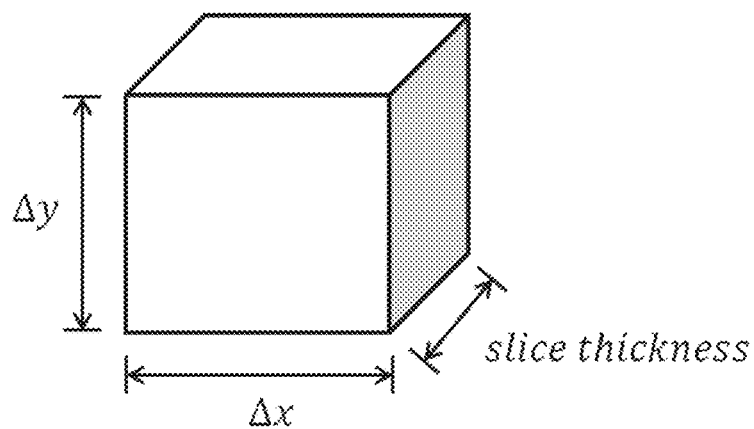
FIG. 17A is a schematic diagram illustrating an exemplary voxel in a 2D image according to some embodiments of the present disclosure.

FIG. 17A is a schematic diagram illustrating an exemplary voxel in a 2D image according to some embodiments of the present disclosure. In some embodiments, the k-space data to be processed may be associated with a two-dimensional (2D) image. The resolution(s) of the 2D image corresponding to the k-space data may include resolution(s) in a plane of the voxel (e.g., $\Delta x$, $\Delta y$), and the slice thickness. The slice thichness may be the thickness between two adjacent slices in MR scan.

Figure 17B:
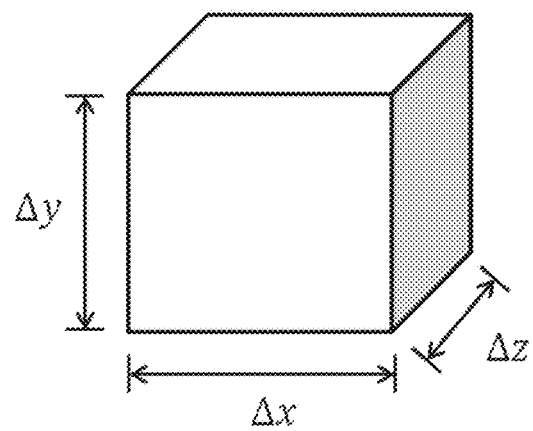
FIG. 17B is a schematic diagram illustrating an exemplary voxel in a 3D image according to some embodiments of the present disclosure.

FIG. 17B is a schematic diagram illustrating an exemplary voxel in a 3D image according to some embodiments of the present disclosure. In some embodiments, the k-space data to be processed may be associated with a three-dimensional (3D) image. The resolution(s) of the k-space data may include three values: $\Delta x$, $\Delta y$, and $\Delta z$. According to the Nyquist theorem, the resolution $\Delta x$ along the frequency encoding direction may be determined based on a highest frequency of sampling points along the frequency encoding direction, the resolution $\Delta y$ along the first phase encoding direction may be determined based on a highest frequency of sampling points along the first phase encoding direction, and the resolution $\Delta z$ along the second phase encoding direction may be determined based on a highest frequency of sampling points along the second phase encoding direction. The second phase encoding direction may be perpendicular to the frequency encoding direction and the first phase encoding direction, the first phase encoding direction may be a phase encoding direction within a slice and the second phase encoding direction may be a phase encoding direction along different slices.

Figure 18:
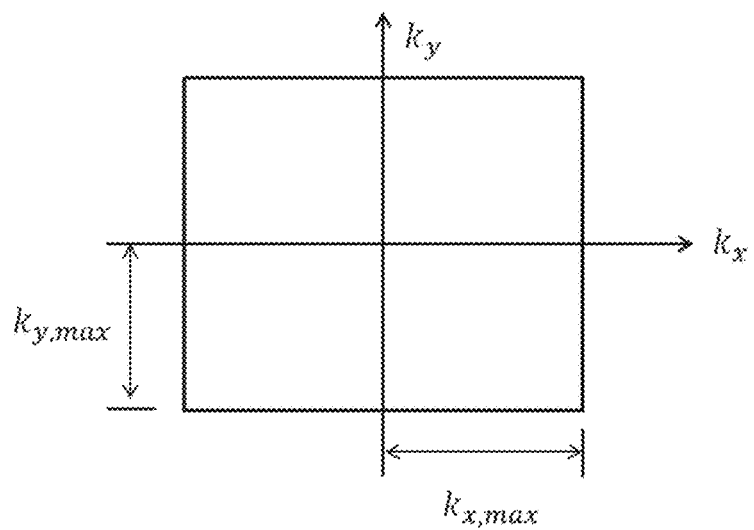
FIG. 18 is a schematic diagram illustrating an exemplary k space in two-dimensional imaging according to some embodiments of the present disclosure.

FIG. 18 is a schematic diagram illustrating an exemplary k space in two-dimensional imaging according to some embodiments of the present disclosure.

In some embodiment, the k-space data generated in two-dimensional imaging may be filled in k space along a frequency encoding direction $k_x$ and a phase encoding direction $k_y$. The resolution along the direction $k_x$ may be expressed as $\Delta x = 1/(2 \cdot k_{x,max})$, and the resolution along the direction $k_y$ may be expressed as $\Delta x = 1/(2 \cdot k_{y,max})$, wherein $k_{x,max}$ denotes a highest frequency of sampling points along the frequency encoding direction, and $k_{y,max}$ denotes a highest frequency of sampling points along the phase encoding direction. In some embodiments, if the sampling frequency of the k-space data is relatively high, the size of a pixel of the image reconstructed based on the k-space data may be relatively small, and the resolution of the image may be relatively high.

Figure 19:
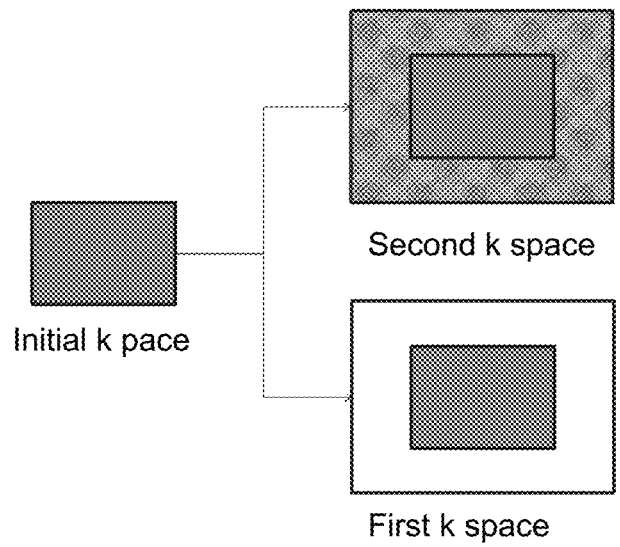
FIG. 19 is a schematic diagram illustrating exemplary k spaces of different k-space data according to some embodiments of the present disclosure.

FIG. 19 is a schematic diagram illustrating exemplary k spaces of different k-space data according to some embodiments of the present disclosure. The first k space of the first processed k-space data may be obtained by padding the initial k space of the initial k-space data with predetermined data. The second k space of the second processed k-space data may be obtained by processing the initial k-space data by using, for example, a processing model. In some embodiments, the first k space and the second k space may have a same k space range, so as to facilitate a fusing of the first processed k-space data and the second processed k-space data.

Figure 20:
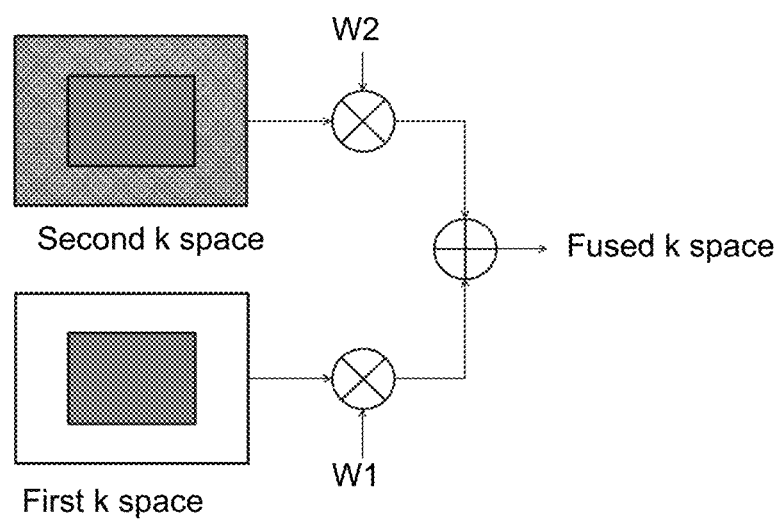
FIG. 20 is a schematic diagram illustrating an exemplary fused k space according to some embodiments of the present disclosure.

FIG. 20 is a schematic diagram illustrating an exemplary fused k space according to some embodiments of the present disclosure. In FIG. 20, the first processed k-space data in the first space may be multiplied by the first weight matrix W1, the second processed k-space data in the second space may be multiplied by the second weight matrix W2. The processing device 120C may generate the target k-space data in the fused k space by fusing the first processed k-space data multiplied by the first weight matrix and the second processed k-space data multiplied by the second weight matrix.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be merged as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a computing device including a storage device and at least one processor for image processing, comprising:
    obtaining an image;
    determining a current resolution level of the image;
    determining, based on the current resolution level of the image, from a group of resolution level ranges, a reference resolution level range corresponding to the image;
    determining a target processing model corresponding to the reference resolution level range, wherein the target processing model is generated by:
        obtaining a plurality of sample images with relatively low resolution levels and a plurality of sample images with relatively high resolution levels;
        grouping the plurality of sample images with relatively low resolution levels and grouping the plurality of sample images with relatively high resolution levels, each group of sample images with relatively low resolution levels corresponding to a group of sample images with relatively high resolution levels, and the each group of sample images with relatively low resolution levels corresponding to a resolution level range of the group of resolution level ranges;
        obtaining a plurality of processing models by training each processing model using a corresponding group of sample images with relatively low resolution levels and a corresponding group of sample images with relatively high resolution levels; and
        selecting, from the plurality of processing models, the target processing model corresponding to the reference resolution level range, wherein
        resolution levels of the sample images with relatively low resolution levels are lower than a resolution level threshold, and resolution levels of the sample images with relatively high resolution levels are higher than or equal to a resolution level threshold; and
    determining a processed image with a target resolution level by processing the image using the target processing model, the target resolution level of the processed image being higher than the current resolution level of the image.

2. The method of claim 1, wherein the determining, based on the current resolution level of the image, from a group of resolution level ranges, a reference resolution level range corresponding to the image comprises:
    designating, from the group of resolution level ranges, a resolution level range including the current resolution level as the reference resolution level range corresponding to the image.

3. The method of claim 1, wherein the group of resolution level ranges is generated according to a process including:
    determining an upper limit of resolution levels;
    determining a lower limit of resolution levels;
    determining a scaling factor; and
    determining the group of resolution level ranges based on the upper limit of resolution levels, the lower limit of resolution levels, and the scaling factor.

4. The method of claim 3, wherein the determining the group of resolution level ranges based on the upper limit of resolution levels, the lower limit of resolution levels, and the scaling factor comprises:
    determining the group of resolution level ranges based on the upper limit of resolution levels, the lower limit of resolution levels, and the scaling factor multiplied by different multiplies.

5. The method of claim 1, wherein the group of resolution level ranges is generated according to a process including:
    determining an upper limit of resolution levels;
    determining a lower limit of resolution levels;
    determining an interval value; and
    determining the group of resolution level ranges with an equal interval based on the upper limit of resolution levels, the lower limit of resolution levels, and the interval value.

6. The method of claim 1, wherein the group of resolution level ranges is generated according to a process including:
    determining an upper limit of resolution levels;
    determining a lower limit of resolution levels;
    determining an interval value; and
    determining the group of resolution level ranges based on the upper limit of resolution levels, the lower limit of resolution levels, and the interval value, the group of resolution level ranges including at least two resolution level ranges with unequal intervals.

7. The method of claim 1, wherein the group of resolution level ranges is generated according to a process including:
    determining the group of resolution level ranges based on a scanning protocol and/or a scanning region of the image.

8. The method of claim 1, wherein the group of resolution level ranges is generated according to a process including:
  determining a magnetic field intensity and/or a pulse sequence used in generating the image; and
  determining the group of resolution level ranges based on the magnetic field intensity and/or the pulse sequence.

9. The method of claim 1, wherein the target processing model corresponding to the reference resolution level range is generated by training an initial processing model using sample images with resolution levels in the reference resolution level range.

10. The method of claim 1, wherein the training each processing model using a corresponding group of sample images with relatively low resolution levels and a corresponding group of sample images with relatively high resolution levels comprises:
  generating estimated images by inputting the corresponding group of sample images with relatively low resolution levels into the each processing model;
  determining a value of a cost function based on the estimated images and the corresponding group of sample images with relatively high resolution levels;
  determining whether a termination condition is satisfied based on the value of the cost function; and
  in response to a determination that the termination condition is not satisfied, updating one or more parameters of the each processing model; or
  in response to a determination that the termination condition is satisfied, determining the each processing model based on the updated parameters.

11. The method of claim 1, wherein the grouping the plurality of sample images with relatively low resolution levels and grouping the plurality of sample images with relatively high resolution levels comprises:
  grouping, based on the group of resolution level ranges, the plurality of sample images with relatively low resolution levels to obtain a plurality of groups of sample images with relatively low resolution levels; and
  grouping the plurality of sample images with relatively high resolution levels based on the plurality of groups of sample images with relatively low resolution levels.

12. The method of claim 1, wherein the grouping the plurality of sample images with relatively low resolution levels and grouping the plurality of sample images with relatively high resolution levels comprises:
  grouping, based on the group of resolution level ranges, the plurality of sample images with relatively high resolution levels to obtain a plurality of groups of sample images with relatively high resolution levels; and
  grouping the plurality of sample images with relatively low resolution levels based on the plurality of groups of sample images with relatively high resolution levels.

13. The method of claim 1, wherein the obtaining a plurality of sample images with relatively low resolution levels and a plurality of sample images with relatively high resolution levels comprises:
  acquiring first data associated with the plurality of sample images with relatively low resolution levels using a magnetic resonance imaging device;
  generating the plurality of sample images with relatively low resolution levels based on the first data;
  acquiring second data associated with the plurality of sample images with relatively high resolution levels using the magnetic resonance imaging device; and
  generating the plurality of sample images with relatively high resolution levels based on the second data.

14. The method of claim 1, wherein the obtaining a plurality of sample images with relatively low resolution levels and a plurality of sample images with relatively high resolution levels comprises:
  acquiring second data associated with the plurality of sample images with relatively high resolution levels using a magnetic resonance imaging device;
  generating the plurality of sample images with relatively high resolution levels based on the second data;
  obtaining first data associated with the plurality of sample images with relatively low resolution levels by removing relatively high frequency data in k space of the plurality of sample images with relatively high resolution levels; and
  generating the plurality of sample images with relatively low resolution levels based on the first data.

15. The method of claim 1, wherein the obtaining a plurality of sample images with relatively low resolution levels and a plurality of sample images with relatively high resolution levels comprises:
  generating first data associated with the plurality of sample images with relatively low resolution levels and second data associated with the plurality of sample images with relatively high resolution levels using a simulation model;
  generating the plurality of sample images with relatively low resolution levels based on the first data; and
  generating the plurality of sample images with relatively high resolution levels based on the second data.

16. The method of claim 1, wherein the current resolution level is lower than a resolution level threshold, and the target resolution level is higher than the resolution level threshold.

17. The method of claim 1, wherein the current resolution level is at least one of
  a resolution along a frequency encoding direction of the image,
  a resolution along a first phase encoding direction of the image,
  a resolution along a second phase encoding direction of the image, or
  a mean value of two or more of the resolution along the frequency encoding direction of the image, the resolution along the first phase encoding direction of the image, or the resolution along the second phase encoding direction of the image.

18. A method implemented on a computing device including a storage device and at least one processor for image processing, comprising:
  obtaining initial k-space data generated by a magnetic resonance imaging device;
  generating first processed k-space data by padding k space of the initial k-space data with predetermined data;
  generating second processed k-space data based on the initial k-space data, an image associated with the second processed k-space data having a higher resolution than an initial image associated with the initial k-space data, wherein the generating the second processed k-space data based on the initial k-space data includes:
    reconstructing the initial image based on the initial k-space data;
    determining a current solution level of the initial image;
    determining, based on the current solution level of the initial image, from a group of resolution level ranges, a reference resolution level range corresponding to the initial image;

determining a target processing model corresponding to the reference resolution level range, wherein the target processing model is generated by:
  obtaining a plurality of sample images with relatively low resolution levels and a plurality of sample images with relatively high resolution levels;
  grouping the plurality of sample images with relatively low resolution levels and grouping the plurality of sample images with relatively high resolution levels, each group of sample images with relatively low resolution levels corresponding to a group of sample images with relatively high resolution levels, and the each group of sample images with relatively low resolution levels corresponding to a resolution level range of the group of resolution level ranges;
  obtaining a plurality of processing models by training each processing model using a corresponding group of sample images with relatively low resolution levels and a corresponding group of sample images with relatively high resolution levels; and
  selecting, from the plurality of processing models, the target processing model corresponding to the reference resolution level range, wherein
    resolution levels of the sample images with relatively low resolution levels are lower than a resolution level threshold, and resolution levels of the sample images with relatively high resolution levels are higher than or equal to a resolution level threshold;
determining a processed image by processing the initial image using the target processing model;
obtaining the second processed k-space data corresponding to the processed image;
determining, based on the initial image, a first weight matrix corresponding to the first processed k-space data and a second weight matrix corresponding to the second processed k-space data;
generating target k-space data based on the first processed k-space data, the second processed k-space data, the first weight matrix, and the second weight matrix; and
reconstructing a target image based on the target k-space data.

19. A system, comprising:
a storage device storing a set of instructions;
at least one processor in communication with the storage device, wherein when executing the set of instructions, the at least one processor is configured to direct the system to perform operations including:
  obtaining an image;
  determining a current resolution level of the image;
  determining, based on the current resolution level of the image, from a group of resolution level ranges, a reference resolution level range corresponding to the image;
  determining a target processing model corresponding to the reference resolution level range, wherein the target processing model is generated by:
    obtaining a plurality of sample images with relatively low resolution levels and a plurality of sample images with relatively high resolution levels;
    grouping the plurality of sample images with relatively low resolution levels and grouping the plurality of sample images with relatively high resolution levels, each group of sample images with relatively low resolution levels corresponding to a group of sample images with relatively high resolution levels, and the each group of sample images with relatively low resolution levels corresponding to a resolution level range of the group of resolution level ranges;
    obtaining a plurality of processing models by training each processing model using a corresponding group of sample images with relatively low resolution levels and a corresponding group of sample images with relatively high resolution levels; and
    selecting, from the plurality of processing models, the target processing model corresponding to the reference resolution level range, wherein
      resolution levels of the sample images with relatively low resolution levels are lower than a resolution level threshold, and resolution levels of the sample images with relatively high resolution levels are higher than or equal to a resolution level threshold; and
  determining a processed image with a target resolution level by processing the image using the target processing model, the target resolution level of the processed image being higher than the current resolution level of the image.

20. The system of claim 19, wherein the determining, based on the current resolution level of the image, from a group of resolution level ranges, a reference resolution level range corresponding to the image comprises:
  designating, from the group of resolution level ranges, a resolution level range including the current resolution level as the reference resolution level range corresponding to the image.

* * * * *